(12) United States Patent
Choi et al.

(10) Patent No.: US 10,254,883 B2
(45) Date of Patent: Apr. 9, 2019

(54) ELECTRONIC DEVICE FOR SENSING PRESSURE OF INPUT AND METHOD FOR OPERATING THE ELECTRONIC DEVICE

(71) Applicant: Samsung Electronics Co., Ltd., Suwon-si, Gyeonggi-do (KR)

(72) Inventors: Byeng-Seok Choi, Yongin-si (KR); Kyu-Hong Kim, Yongin-si (KR); Byung-Jin Kang, Seoul (KR); Cha-Kyum Kim, Seoul (KR); Na-Jung Seo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 138 days.

(21) Appl. No.: 15/254,204

(22) Filed: Sep. 1, 2016

(65) Prior Publication Data

US 2017/0068381 A1    Mar. 9, 2017

(30) Foreign Application Priority Data

Sep. 9, 2015 (KR) .................. 10-2015-0127830

(51) Int. Cl.
| | |
|---|---|
| *G06F 1/16* | (2006.01) |
| *G06F 3/14* | (2006.01) |
| *G06F 3/041* | (2006.01) |
| *G06F 3/044* | (2006.01) |
| *G06F 3/0486* | (2013.01) |
| *G06F 3/0488* | (2013.01) |

(52) U.S. Cl.
CPC .......... *G06F 3/0416* (2013.01); *G06F 1/1641* (2013.01); *G06F 1/1647* (2013.01); *G06F 3/044* (2013.01); *G06F 3/0414* (2013.01); *G06F 3/0488* (2013.01); *G06F 3/04883* (2013.01); *G06F 3/1423* (2013.01); *G06F 3/0486* (2013.01); *G06F 2203/04102* (2013.01); *G06F 2203/04104* (2013.01); *G06F 2203/04105* (2013.01)

(58) Field of Classification Search
CPC .......... G09G 2360/04; G09G 2300/026; G06F 3/0414
See application file for complete search history.

(56) References Cited

U.S. PATENT DOCUMENTS

| | | |
|---|---|---|
| 2009/0091512 A1 | 4/2009 | Jung et al. |
| 2011/0193805 A1 | 8/2011 | Park et al. |
| 2012/0060089 A1* | 3/2012 | Heo .................. G06F 1/1647 |
| | | 715/702 |

(Continued)

FOREIGN PATENT DOCUMENTS

| | | |
|---|---|---|
| EP | 2 674 834 A2 | 12/2013 |
| KR | 10-2009-0036191 A | 4/2009 |

(Continued)

*Primary Examiner* — Laurence J Lee
(74) *Attorney, Agent, or Firm* — Jefferson IP Law, LLP

(57) ABSTRACT

An electronic device including a plurality of displays and a method for operating the electronic device are provided. The method includes sensing pressure of an input to at least one of the plurality of displays, executing a first function in correspondence with the input if the sensed pressure is equal to or greater than a threshold, and executing a second function different from the first function in correspondence with the input if the sensed pressure is less than the threshold.

18 Claims, 28 Drawing Sheets

(56) References Cited

U.S. PATENT DOCUMENTS

| | | | | |
|---|---|---|---|---|
| 2012/0139864 A1* | 6/2012 | Sleeman | ............... | G06F 3/044 |
| | | | | 345/174 |
| 2012/0306765 A1 | 12/2012 | Moore | | |
| 2013/0342729 A1* | 12/2013 | Kim | ............... | H04N 5/772 |
| | | | | 348/231.3 |
| 2014/0218918 A1* | 8/2014 | Moriwaki | ............... | H04N 5/64 |
| | | | | 362/237 |
| 2015/0002406 A1* | 1/2015 | Small | ............... | G06F 3/041 |
| | | | | 345/173 |
| 2016/0283181 A1* | 9/2016 | Jung | ............... | G06F 3/1446 |

FOREIGN PATENT DOCUMENTS

| | | |
|---|---|---|
| KR | 10-2011-0092826 A | 8/2011 |
| WO | 2013/169875 A2 | 11/2013 |

* cited by examiner

ELECTRONIC DEVICE FOR SENSING PRESSURE OF INPUT AND METHOD FOR OPERATING THE ELECTRONIC DEVICE

CROSS-REFERENCE TO RELATED APPLICATION(S)

This application claims the benefit under 35 U.S.C. § 119(a) of a Korean patent application filed on Sep. 9, 2015 in the Korean Intellectual Property Office and assigned Serial number 10-2015-0127830, the entire disclosure of which is hereby incorporated by reference.

TECHNICAL FIELD

The present disclosure relates to an electronic device and a method for operating the electronic device. More particularly, the present disclosure relates to an electronic device for sensing the pressure of an input and performing an operation corresponding to the sensed pressure, and a method for operating the electronic device.

BACKGROUND

Currently, various electronic devices have gained popularity and are increasingly used. The electronic devices may receive inputs in various input schemes such as physical key input, touch input, and voice recognition. Among the input schemes, the touch input scheme is widely used.

In the touch input scheme, an input is applied to a screen displayed on a display of an electronic device by means of various objects including a user's hand or a pen (e.g., digital pen or digital stylus). Since the touch input scheme allows a user to directly manipulate the screen displayed on the display of the electronic device, it is very intuitive and convenient.

Owing to the recent development in technology, electronic devices are becoming more capable of executing ever more functions. However, only limited patterns including tap touch, double tap touch, drag and drop, and swipe are available in the touch input scheme, and thus the touch input scheme has limitations in its effectiveness in accommodating various functions of the electronic device.

As a consequence, even though the electronic devices may support new functions, a touch pattern that facilitates execution of the new functions in the electronic device may not be allocated, and thus users may have difficulty in easily using the new functions in the electronic devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure address at least the above-mentioned problems and/or disadvantages and provide at least the advantages described below. Accordingly, an aspect of the present disclosure is to provide an electronic device for detecting a pressure level of an input and performing an operation corresponding to the sensed pressure level.

Another aspect of the present disclosure is to provide an electronic device for sensing various inputs by detecting pressure levels of the inputs.

In accordance with an aspect of the present disclosure, a method for operating an electronic device having a plurality of displays is provided. The method includes sensing pressure of an input to at least one of the plurality of displays, executing a first function in correspondence with the input, if the sensed pressure is equal to or greater than a threshold, and executing a second function different from the first function in correspondence with the input, if the sensed pressure is less than the threshold.

In accordance with another aspect of the present disclosure, an electronic device is provided. The electronic device includes a plurality of displays, a pressure sensor configured to sense pressure of an input to at least one of the plurality of displays, a memory, and a processor electrically connected to the memory. The memory stores instructions configured to be executed by the processor. The processor is configured to control for sensing pressure of an input to at least one of the plurality of displays. The processor is further configured to control for, if the sensed pressure is equal to or greater than a threshold, executing a first function in correspondence with the input, and, if the sensed pressure is less than the threshold, executing a second function different from the first function in correspondence with the input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
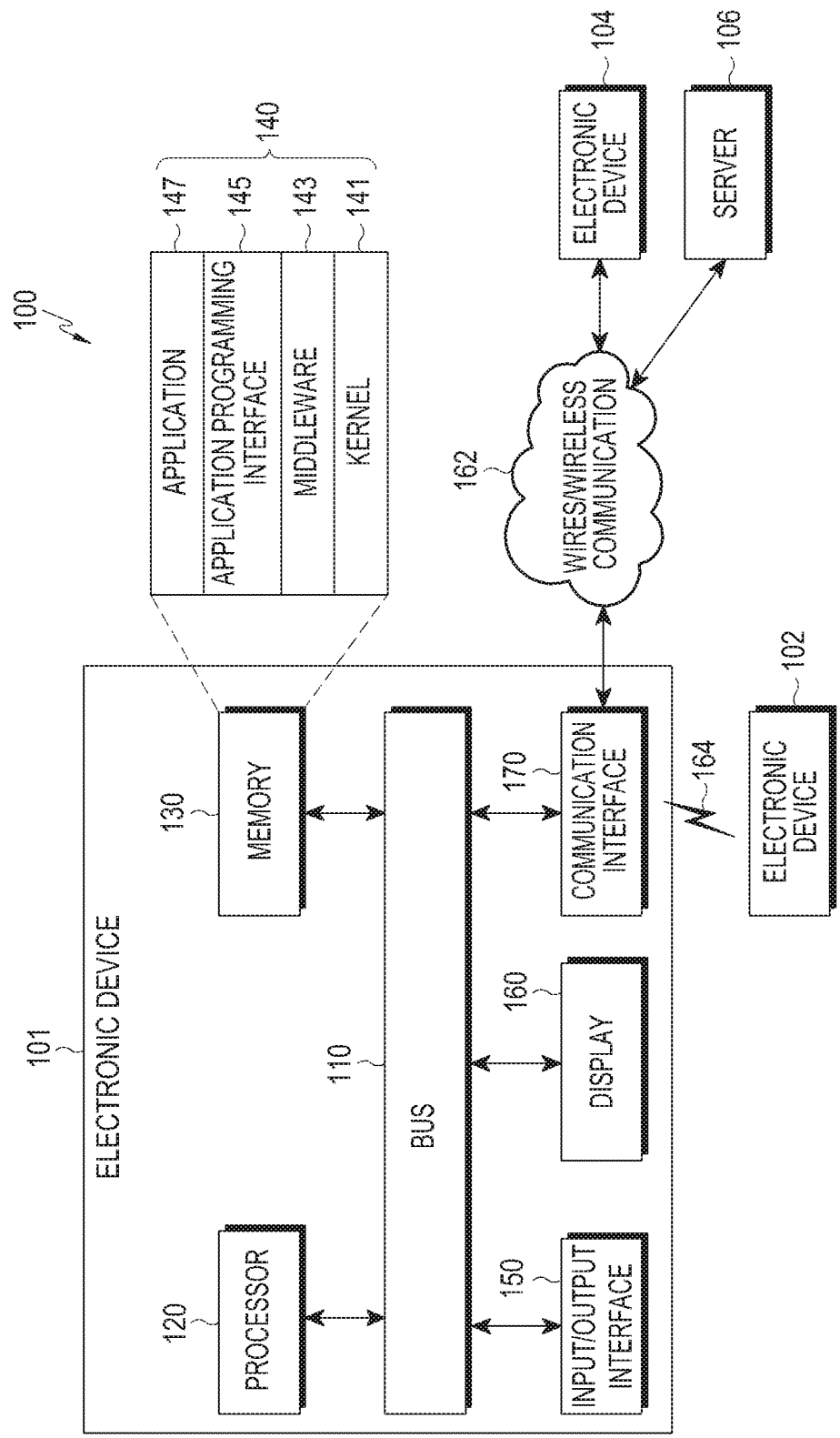
FIG. 1 is a block diagram illustrating an electronic device and a network according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the term 'have', 'may have', 'include', or 'may include' signifies the presence of a specific feature (for example, number, function, operation, or component such as part), not excluding the presence of one or more other features.

In present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding various embodiments of the present disclosure.

An electronic device according to various embodiments of the present disclosure may be at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical equipment, a camera, or a wearable device. According to various embodiments, the wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), a body-attached type (for example, a skin pad or a tattoo), or an implantable type (for example, an implantable circuit).

According to some embodiments of the present disclosure, an electronic device may be a home appliance. For example, the home appliance may be at least one of, for example, a television (TV), a digital versatile disc (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, or the like), a game console (for example, Xbox™, PlayStation™, or the like), an electronic dictionary, an electronic key, a camcorder, or an electronic picture frame.

According to various embodiments of the present disclosure, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler).

According to some embodiments of the present disclosure, an electronic device may be at least one of furniture, part of a building/structure, an electronic board, an electronic signature receiving device, a projector, and various measuring devices (for example, water, electricity, gas or electro-magnetic wave measuring devices). According to various embodiments of the present disclosure, an electronic device may be one or a combination of two or more of the foregoing devices. According to some embodiments of the present disclosure, an electronic device may be a flexible electronic device. In addition, it will be apparent to one having ordinary skill in the art that an electronic device according to an embodiment of the present disclosure is not limited to the foregoing devices and covers a new electronic device produced along with technology development.

With reference to the attached drawings, an electronic device according to various embodiments of the present disclosure will be described below. In the present disclosure, the term 'user' may refer to a person or device (for example, artificial intelligence electronic device) that uses an electronic device.

FIG. 1 is a block diagram illustrating an electronic device and a network according to various embodiments of the present disclosure.

Referring to FIG. 1, an electronic device 101 in a network environment 100 according to various embodiments of the present disclosure is described. The electronic device 101 may include a bus 110, a processor 120, a memory 130, an input/output (I/O) interface 150, a display 160, and a communication module 170. In some embodiments, at least one of the components may be omitted in the electronic device 101 or a component may be added to the electronic device 101.

The bus 110 may include a circuit that interconnects, for example, the foregoing components 120, 130, 150, 160, and 170 and allows communication (for example, control messages and/or data) between the foregoing components.

The processor 120 may include one or more of a CPU, an AP, or a communication processor (CP). The processor 120 may, for example, execute computation or data processing related to control and/or communication of at least one other component of the electronic device 101.

The memory 130 may include a volatile memory and/or a non-volatile memory. The memory 130 may, for example, store instructions or data related to at least one other component. According to an embodiment of the present disclosure, the memory 130 may store software and/or programs 140. The programs 140 may include, for example, a kernel 141, middleware 143, an application programming interface (API) 145, and/or application programs (or applications) 147. At least a part of the kernel 141, the middleware 143, and the API 145 may be called an operating system (OS).

The kernel 141 may control or manage system resources (for example, the bus 110, the processor 120, or the memory 130) that are used in executing operations or functions implemented in other programs such as the middleware 143, the API 145, or the application programs 147. Also, the kernel 141 may provide an interface for allowing the middleware 143, the API 145, or the application programs 147 to access individual components of the electronic device 101 and control or manage system resources.

Referring to FIG. 1, the middleware 143 may serve as a medium through which the kernel 141 may communicate with, for example, the API 145 or the application programs 147 to transmit and receive data.

Also, the middleware 143 may process one or more task requests received from the application programs 147 according to their priority levels. For example, the middleware 143 may assign priority levels for using system resources (the bus 110, the processor 120, or the memory 130) of the electronic device 101 to at least one of the application programs 147. For example, the middleware 143 may perform scheduling or load balancing for the one or more task requests by processing the one or more task requests according to the priority levels assigned to the at least one application program 147.

The API 145 is an interface that may control functions that the application programs 147 provide at the kernel 141 or the middleware 143. For example, the API 145 may include at least one interface or function (for example, a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (for example, text, an image, a video, an icon, or a symbol) to the user. The display 160 may include a touch screen and receive, for example, a touch input, a gesture input, a proximity input, or a hovering input through an electronic pen or a user's body part.

The communication module 170 may establish communication, for example, between the electronic device 101 and an external device (for example, a first external electronic device 102, a second external electronic device 104, or a server 106). For example, the communication module 170 may be connected to a network 162 by wireless communication or wired communication and communicate with the external device (for example, the second external electronic device 104 or the server 106) over the network 162.

Referring to FIG. 1, the wireless communication may be conducted using, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol. The wireless communication may include, for example, short-range communication 164. The short-range communication 164 may be conducted by, for example, at least one of wireless fidelity (WiFi), Bluetooth (BT), near field communication (NFC), or GNSS. GNSS may include, for example, at least one of global positioning system (GPS), global navigation satellite system (Glonass), Beidou navigation satellite system (hereinafter, referred to as 'Beidou'), or Galileo, the European global satellite-based navigation system, according to a region using the GNSS or a used bandwidth. In the present disclosure, the terms 'GPS' and 'GNSS' are interchangeably used with each other. The wired communication may be conducted in conformance to, for example, at least one of universal serial bus (USB), high definition multimedia interface (HDMI), recommended standard 232 (RS-232), or plain old telephone service (POTS). The network 162 may be a communication network, for example, at least one of a computer network (for example, local area network (LAN) or wide area network (WAN)), the Internet, or a telephone network.

Referring to FIG. 1, each of the first and second external electronic devices 102 and 104 may be of the same type as or a different type from the electronic device 101. According to an embodiment of the present disclosure, the server 106 may include a group of one or more servers. According to various embodiments of the present disclosure, all or a part of operations performed in the electronic device 101 may be performed in one or more other electronic devices (for example, the electronic devices 102 and 104) or the server 106. According to an embodiment of the present disclosure, if the electronic device 101 is to perform a function or a service automatically or upon request, the electronic device 101 may request at least a part of functions related to the function or the service to another device (for example, the electronic device 102 or 104 or the server 106), instead of performing the function or the service autonomously, or additionally. The other electronic device (for example, the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
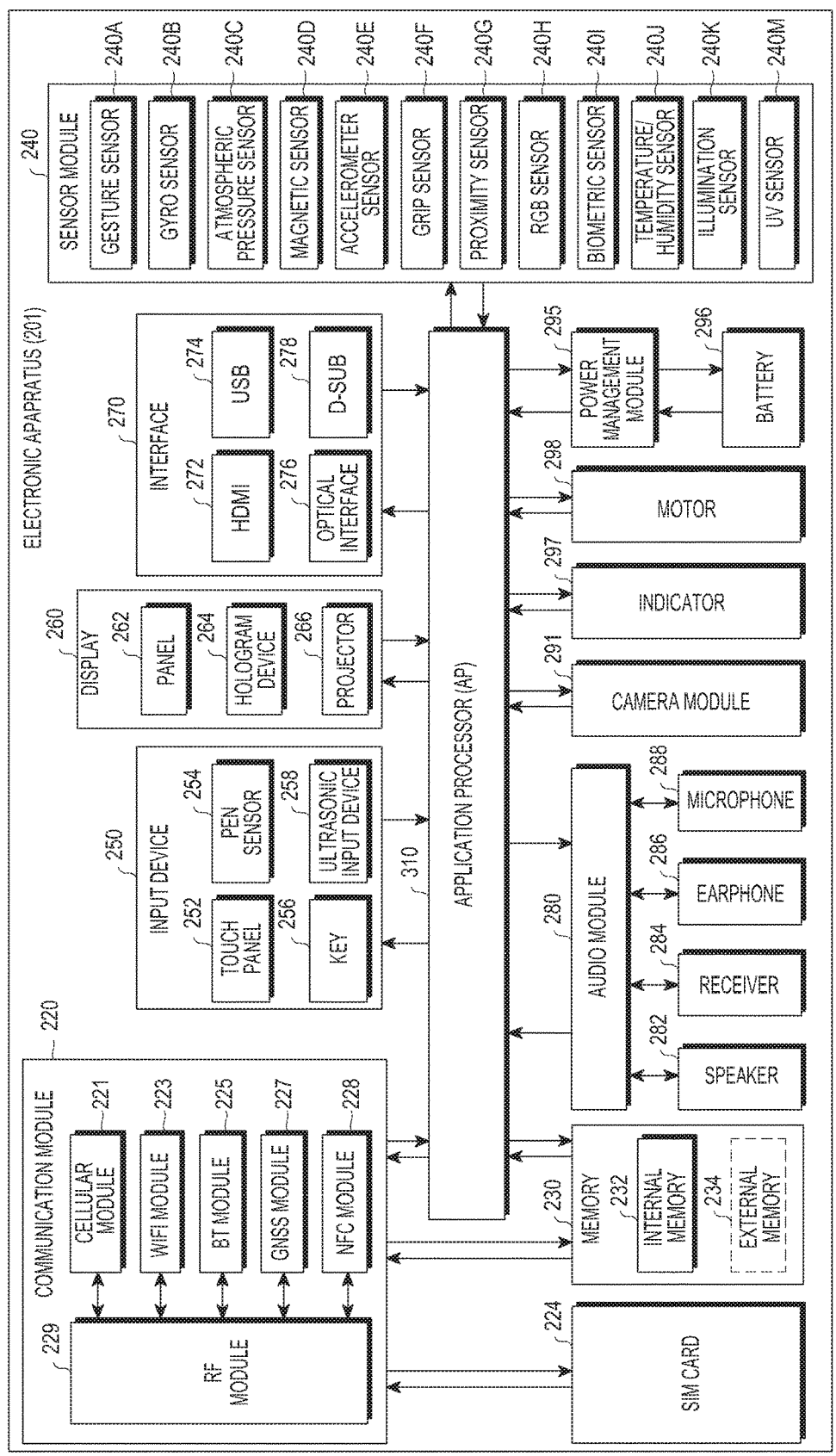
FIG. 2 is a block diagram illustrating an electronic device according to various embodiments of the present disclosure.

FIG. 2 is a block diagram of an electronic device 201 according to various embodiments of the present disclosure.

The electronic device 201 may include, for example, the whole or part of the electronic device 101 illustrated in FIG. 1. The electronic device 201 may include at least one processor (for example, AP) 310, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 310 may, for example, control a plurality of hardware or software components that are connected to the processor 310 by executing an OS or an application program and may perform processing or computation of various types of data. The processor 310 may be implemented, for example, as a system on chip (SoC). According to an embodiment of the present disclosure, the processor 310 may further include a graphics processing unit (GPU) and/or an image signal processor (ISP). The processor 310 may include at least a part (for example, a cellular module 221) of the components illustrated in FIG. 2. The processor 310 may load a command or data received from at least one of other components (for example, a non-volatile memory), process the loaded command or data, and store various types of data in the non-volatile memory.

Referring to FIG. 2, the communication module 220 may have the same configuration as or a similar configuration to the communication module 170 illustrated in FIG. 1. The communication module 220 may include, for example, the cellular module 221, a WiFi module 223, a BT module 225, a GNSS module 227 (for example, a GPS module, a Glonass module, a Beidou module, or a Galileo module), an NFC module 228, and a radio frequency (RF) module 229.

The cellular module 221 may provide services such as voice call, video call, text service, or the Internet service, for example, through a communication network. According to an embodiment of the present disclosure, the cellular module 221 may identify and authenticate the electronic device 201 within a communication network, using the SIM (for example, a SIM card) 224. According to an embodiment of the present disclosure, the cellular module 221 may perform at least a part of the functionalities of the processor 210. According to an embodiment of the present disclosure, the cellular module 221 may include a communication processor (CP).

Each of the WiFi module 223, the BT module 225, the GNSS module 227, and the NFC module 228 may include, for example, a processor that may process data received or transmitted by the module. According to an embodiment of the present disclosure, at least a part (for example, two or more) of the cellular module 221, the Wi-Fi module 223, the BT module 225, the GNSS module 227, or the NFC module 228 may be included in a single integrated chip (IC) or IC package.

The RF module 229 may transmit and receive, for example, communication signals (for example, RF signals). The RF module 229 may include at least one of, for example, a transceiver, a power amplifier module (PAM), a frequency filter, a low noise amplifier (LNA), an antenna, or the like. According to another embodiment of the present disclosure, at least one of the cellular module 221, the WiFi module 223, the BT module 225, the GNSS module 227, or the NFC module 228 may transmit and receive RF signals via a separate RF module.

The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

Referring to FIG. 2, the memory 230 (for example, memory 130) may include, for example, an internal memory 232 or an external memory 234. The internal memory 232 may be at least one of, for example, a volatile memory (for example, dynamic random access memory (DRAM), static RAM (SRAM), or synchronous dynamic RAM (SDRAM)), and a non-volatile memory (for example, one time programmable read only memory (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state driver (SSD).

The external memory 234 may further include a flash drive such as a compact flash (CF) drive, a secure digital (SD), a micro-SD, a mini-SD, an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, or an ultraviolet (UV) sensor 240M. Additionally or alternatively, the sensor module 240 may include other sensors (not shown), for example, an electrical-nose (E-nose) sensor, an electromyogram (EMG) sensor, an electroencephalogram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments of the present disclosure, the electronic device 201 may further include a processor configured to control the sensor module 240, as a part of or separately from the processor 210. Thus, while the processor 310 is in a sleep state, the control circuit may control the sensor module 240.

The sensor module 240 may further include a pressure sensor.

The pressure sensor may sense pressure applied to the electronic device (for example, the electronic device 101 or 201). For example, the pressure sensor may sense the pressure of an input to the display 260 of the electronic device 201. The pressure sensor will be described later.

Referring to FIG. 2, the input device 250 may include, for example, a touch panel 252, a digital stylus or (digital) pen sensor 254, a key 256, or an ultrasonic input device 258. The touch panel 252 may operate in at least one of, for example, capacitive, resistive, infrared, and ultrasonic schemes. The touch panel 252 may further include a control circuit. The touch panel 252 may further include a tactile layer to thereby provide haptic feedback to the user.

The digital stylus or (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (for example, a microphone 288), and identify data corresponding to the sensed ultrasonic signals.

The display 260 (for example, the display 160) may include a panel 262, a hologram device 264, or a projector 266. The panel 262 may have the same configuration as or a similar configuration to the display 160 illustrated in FIG. 1. The panel 262 may be configured to be, for example, flexible, transparent, or wearable. The panel 262 and the touch panel 252 may be implemented as a single module. The hologram device 264 may utilize the interference of light waves to provide a three-dimensional image in empty space. The projector 266 may display an image by projecting light on a screen. The screen may be positioned, for example, inside or outside the electronic device 201. According to an embodiment of the present disclosure, the display 260 may further include a control circuit for controlling the panel 262, the hologram device 264, or the projector 266. In addition, as described before, the display 260 may include a plurality of displays, which will be described later.

Referring to FIG. 2, the interface 270 may include, for example, an HDMI 272, a USB 274, an optical interface 276, or a D-subminiature (D-sub) 278. The interface 270 may be included, for example, in the communication module 170 illustrated in FIG. 1. Additionally or alternatively, the interface 270 may include, for example, a mobile high-definition link (MHL) interface, an SD/MMC interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment of the present disclosure, the camera module 291 may include one or more image sensors (for example, a front sensor or a rear sensor), a lens, an ISP, or a flash (for example, an LED or a xenon lamp).

The power management module 295 may manage power of, for example, the electronic device 201. According to an embodiment of the present disclosure, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

Referring to FIG. 2, the indicator 297 may indicate specific states of the electronic device 201 or a part of the electronic device 201 (for example, the processor 210), for example, boot status, message status, or charge status. The motor 298 may convert an electrical signal into a mechanical vibration and generate vibrations or a haptic effect. While not shown, the electronic device 201 may include a processing device for supporting mobile TV (for example, a GPU). The processing device for supporting mobile TV may process media data compliant with, for example, digital multimedia broadcasting (DMB), digital video broadcasting (DVB), or MediaFLO™.

Figure 3:
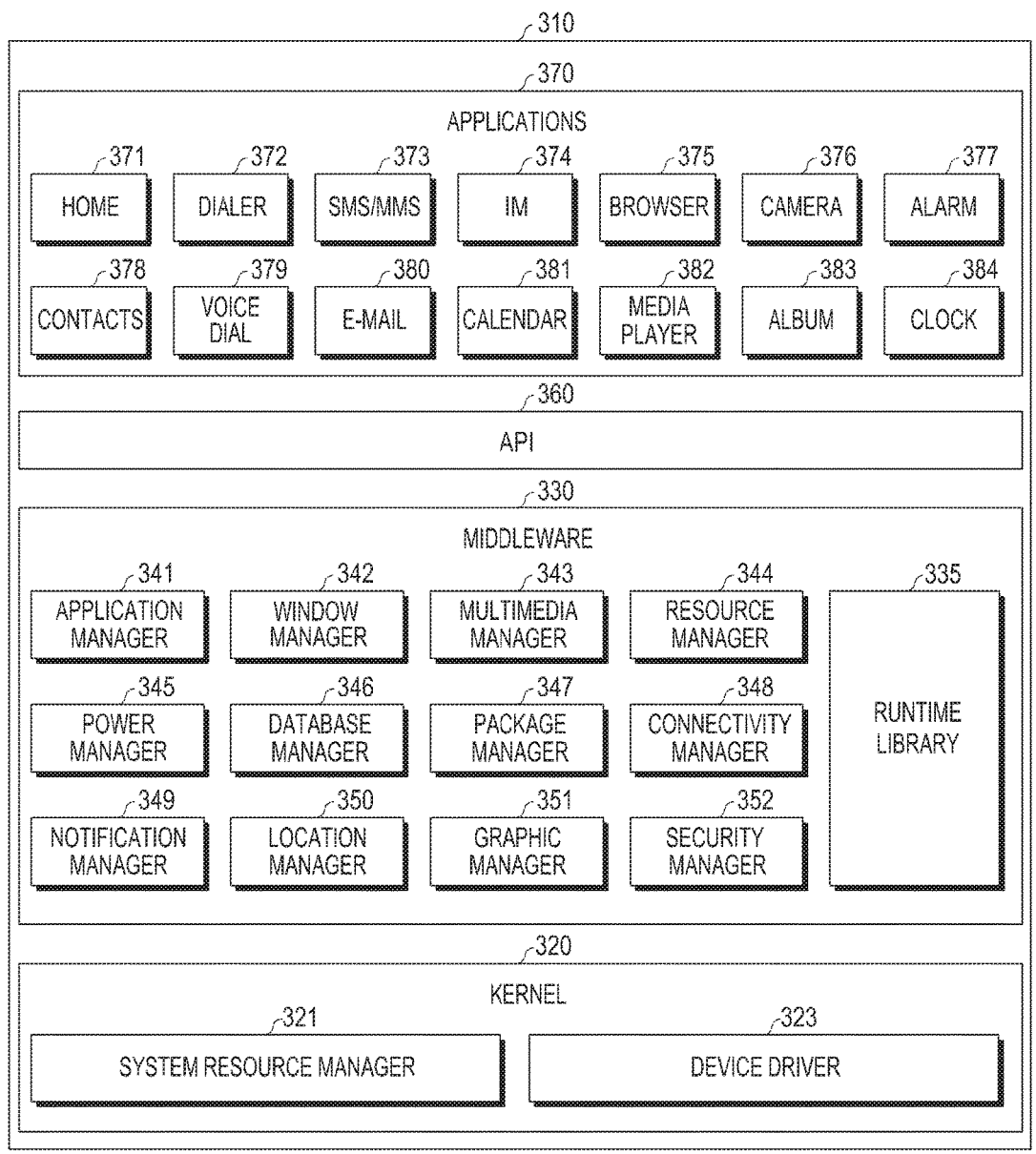
FIG. 3 is a block diagram illustrating a programming module according to various embodiments of the present disclosure.

FIG. 3 is a block diagram of a programming module according to various embodiments of the present disclosure.

According to an embodiment of the present disclosure, a programming module 310 (for example, a program 140) may include an operating system (OS) that controls resources related to an electronic device (for example, the electronic device 101) and/or various applications executed on the OS (for example, the application programs 147). For example, the OS may be Android®, iOS®, Windows®, Symbian®, Tizen®, Bada®, or the like.

Referring to FIG. 3, the programming module 310 may include a kernel 320, middleware 330, an Application Programming Interface (API) 360, and/or applications 370. At least a part of the programming module 310 may be preloaded on the electronic device or downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or deallocate system resources. According to an embodiment of the present disclosure, the system resource manager 321 may include at least one of a process manager, a memory manager, or a file system manager. The device driver 323 may include, for example, a display driver, a camera driver, a BT driver, a shared memory driver, a USB driver, a keypad driver, a WiFi driver, an audio driver, or an inter-process communication (IPC) driver.

Referring to FIG. 3, the middleware 330 may, for example, provide a function required commonly for the applications 370 or provide various functionalities to the applications 370 through the API 360 so that the applications 370 may efficiently use limited system resources available within the electronic device. According to an embodiment of the present disclosure, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

Referring to FIG. 3, the runtime library 335 may include, for example, a library module that a complier uses to add a new function in a programming language during execution of an application 370. The runtime library 335 may perform I/O management, memory management, a function related to arithmetic function, or the like.

The application manager 341 may manage, for example, the life cycle of at least one of the applications 370. The window manager 342 may manage graphical user interface (GUI) resources used for a screen. The multimedia manager 343 may determine formats required to play back various media files and may encode or decode a media file using a compression/decompression (CODEC) suitable for the format of the media file. The resource manager 344 may manage resources such as a source code of at least one of the applications 370, a memory, or storage space.

The power manager 345 may, for example, manage a battery or a power source by operating in conjunction with a basic input/output system (BIOS) and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity of WiFi, BT, or the like. The notification manager 349 may indicate or notify an event such as message arrival, a schedule, a proximity alarm, or the like in a manner that does not bother a user. The location manager 350 may mange position information about the electronic device. The graphic manager 351 may manage graphical effects to be provided to the user or related user interfaces. The security manager 352 may provide an overall security function required for system security, user authentication, or the like. In an embodiment, if the electronic device (for example, the electronic device 101) has a telephony function, the middleware 330 may further include a telephony manager to manage a voice or video call function of the electronic device.

A new middleware module may be created and used by combining various functions of the above-described component modules in the middleware 330. The middleware 330 may provide a customized module for each OS type in order to provide differentiated functions. In addition, the middleware 330 may dynamically delete a part of the existing components or add a new component.

Referring to FIG. 3, the API 360 (for example, the API 145 shown in FIG. 1) is, for example, a set of API programming functions, which may be configured differently according to an OS. For example, in the case of Android or iOS, one API set may be provided per platform, whereas in the case of Tizen, two or more API sets may be provided per platform.

The applications 370 (for example, the application programs 147) may include, for example, one or more applications capable of providing functions such as home 371, dialer 372, short message service (SMS)/multimedia messaging service (MMS) 373, instant message (IM) 374, browser 375, camera 376, alarm 377, contacts 378, voice dial 379, e-mail 380, calendar 381, media player 382, album 383, or clock 384, health care (for example, measurement of an exercise amount or a glucose level), or providing of environment information (for example, information about atmospheric pressure, humidity, or temperature).

According to an embodiment of the present disclosure, the applications 370 may include an application (for the convenience of description, referred to as 'information exchange application') supporting information exchange between the electronic device (for example, the electronic device 101 shown in FIG. 1) and an external electronic device (the electronic device 102 or 104). The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device (for example, the electronic device 102 or 104). Also, the notification relay application may, for example, receive notification information from the external electronic device and transmit the received notification information to a user.

The device management application may, for example, manage (for example, install, delete, or update) at least a part of functions of the external electronic device (for example, the electronic device 102 or 104 shown in FIG. 1) communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment of the present disclosure, the applications 370 may include an application (for example, a health care application of a mobile medical equipment) designated according to a property of the external electronic device (for example, the electronic device 102 or 104). According to an embodiment of the present disclosure, the applications 370 may include an application received from an external electronic device (for example, the server 106 or the electronic device 102 or 104). According to an embodiment, the applications 370 may include a preloaded application or a third party application downloadable from a server. The names of components of the programming module 310 according to the embodiment of the present disclosure may vary according to the type of an OS.

According to various embodiments of the present disclosure, at least a part of the programming module 310 may be implemented in software, firmware, hardware, or a combination of at least two of them. At least a part of the programming module 310 may be implemented (for example, executed) by the processor (for example, the processor 210). At least a part of the programming module 310 may include, for example, a module, a program, a routine, a set of instructions, or a process to execute one or more functions.

At least a part of apparatuses (for example, modules or their functions) or methods (for example, operations) according to various embodiments of the present disclosure may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

Figure 4:
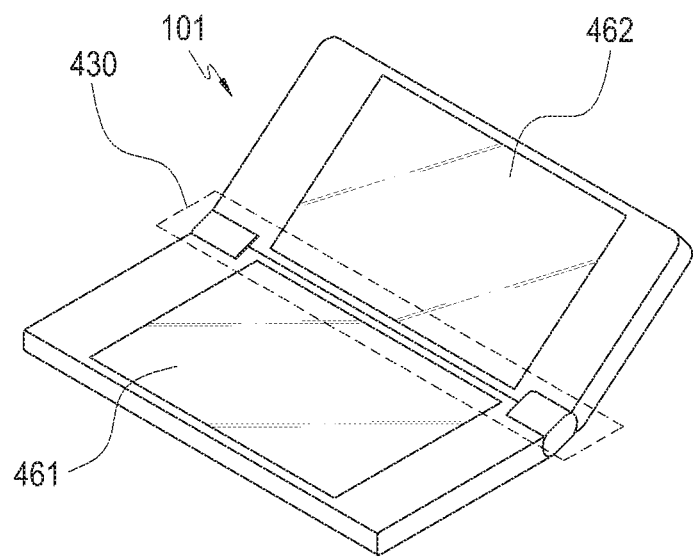
FIG. 4 is a view illustrating an electronic device having a plurality of displays according to various embodiments of the present disclosure.

FIG. 4 is a view illustrating an electronic device having a plurality of displays according to various embodiments of the present disclosure.

Referring to FIG. 4, the electronic device 101 may include a plurality of displays which are a first display 461 and a second display 462. Each of the first and second displays 461 and 462 may include a touch screen. Therefore, the electronic device 101 may receive a touch input, a gesture input, a proximity input, or a hovering input applied to at least one of the first and second displays 461 and 462 by an electronic pen or a part of a user's body. The first and second displays 461 and 462 may be folded or unfolded at a predetermined angle around a central shaft 430. A hinge or a part of a flexible display may be used to connect the first and second displays 461 and 462 with each other at the central shaft 430.

In addition, the electronic device 101 may include at least one flexible or stretchable display. The at least one flexible or stretchable display included in the electronic device 101 may be modified so as to have a plurality of separate areas like a plurality of displays.

In addition, the electronic device (for example, the electronic device 101 or 201) may sense the pressure of an input to the display 160 provided in the electronic device.

An operation for sensing the pressure of an input will be described below with reference to FIG. 5.

Figure 5:
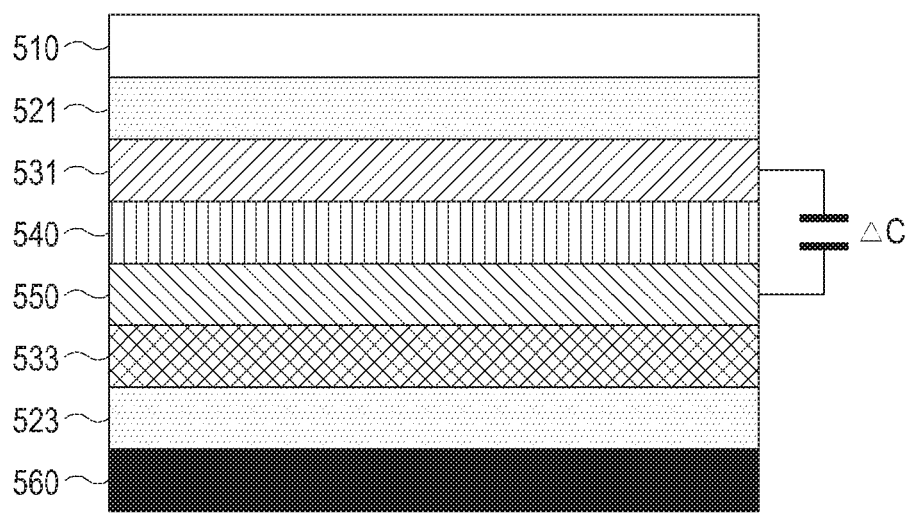
FIG. 5 is a partial sectional view illustrating a pressure sensing structure in an electronic device according to various embodiments of the present disclosure.

FIG. 5 is a partial sectional view illustrating a pressure sensing structure in an electronic device according to various embodiments of the present disclosure.

Referring to FIG. 5, a partial structure of the electronic device 101 may include a display panel 510, a first fixing member 521, a stacked plate 531, a spacer 540, a pressure sensor 550, a printed circuit board (PCB) 533, a second fixing member 523, and a bracket 560 in this order.

The display panel 510 may be the afore-described display 160 (shown in FIG. 1) or touch panel 262 (shown in FIG. 2). Also, the display panel 510 and the touch panel 252 may be incorporated into a single module.

The first fixing member 521 may fix the display panel 510 and the stacked plate 531 together. For example, the first fixing member 521 may be a double-sided adhesive tape.

The stacked plate 531 may be a substrate capable of providing a ground GND as an electrical reference. For example, the stacked plate 531 may be a copper clad laminate.

The spacer 540 may keep the stacked plate 531 and the pressure sensor 550 apart from each other by a predetermined gap, and change the gap between the stacked plate 531 and the pressure sensor 550 in correspondence with the pressure of an input to the display panel 510. For example, the spacer 540 may be formed of silicon.

The pressure sensor 550 may induce static charge between the pressure sensor 550 and the stacked plate 531, and sense capacitance between the pressure sensor 550 and the stacked plate 531. Further, the pressure sensor 550 may sense a variation Δf the capacitance between the pressure sensor 550 and the stacked plate 531.

The PCB 533 may electrically interconnect components of the electronic device 101.

For example, the PCB 533 may be a flexible PCB (FPCB) for which a flexible insulation substrate is used.

The second fixing member 523 may fix the PCB 533 to the bracket 560. For example, the second fixing member 523 may be a double-sided adhesive tape.

The bracket 560 may be a fixing member for fixing the afore-described components of the electronic device 101 inside the electronic device 101.

With reference to FIG. 5, a description will be given for sensing the pressure of an input by the pressure sensor 550.

The thickness of the spacer 540 corresponding to the gap between the stacked plate 531 and the pressure sensor 550 may be changed according to the pressure of an input to the touch panel 510. The pressure sensor 550 may sense a variation ΔC of the capacitance between the pressure sensor 550 and the stacked plate 531, caused by a change of the distance between the stacked plate 531 and the pressure sensor 550 with the space 540 in between according to the pressure of an input to the touch panel 510. The pressure sensor 550 may sense the pressure of the input to the touch panel 510 based on the variation ΔC of the capacitance.

Further, the processor 120 (shown in FIG. 1) or 310 (shown in FIG. 2) may receive information about the sensed capacitance from the pressure sensor 550, and calculate the pressure of the input to the touch panel 510 based on the capacitance variation sensed by the pressure sensor 550.

In addition, the pressure sensor 550 may sense the pressure of a plurality of individual inputs. For example, the pressure sensor 550 may sense a capacitance variation ΔC at each of a plurality of points, and sense the pressure of each of a plurality of inputs based on the capacitance variations ΔC of the plurality of points.

According to various embodiments of the present disclosure, the electronic device 101 may detect the position and pressure of an input.

For example, the electronic device 101 may detect the position of an input sensed through the touch panel 252 and detect the pressure of the input sensed through the pressure sensor 550. Accordingly, the electronic device 101 may detect the position and pressure of the input.

The above description of detection of the pressure of an input has been given as an example and thus should not be construed as limiting the present disclosure. Therefore, the electronic device according to various embodiments of the present disclosure may sense the pressure of an input to a display in various manners.

Figure 6:
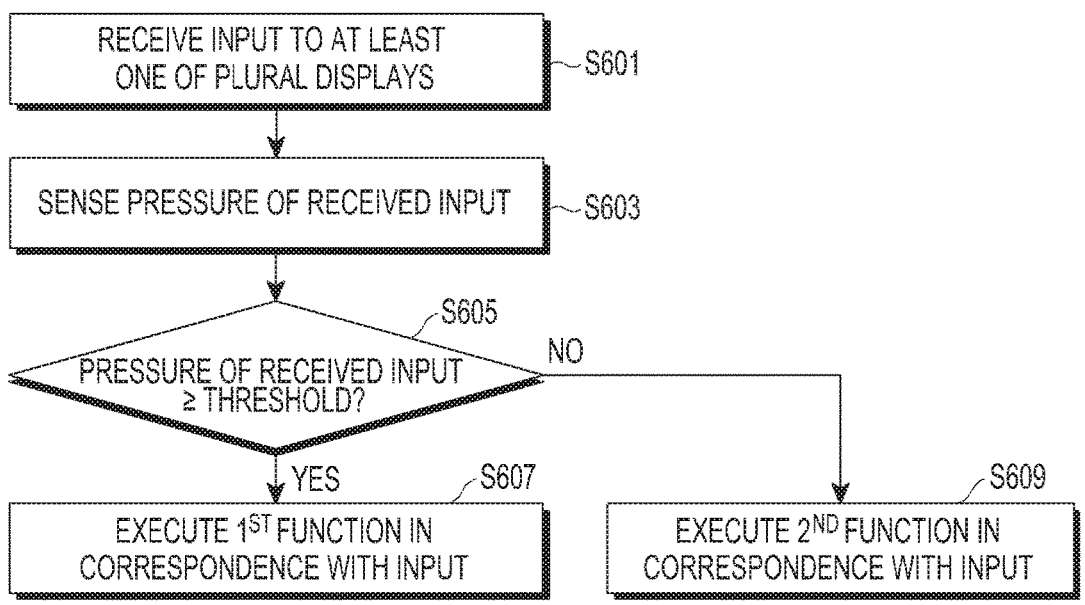
FIG. 6 is a flowchart illustrating an operation of an electronic device according to various embodiments of the present disclosure.

With reference to FIG. 6, an operation of an electronic device according to various embodiments of the present disclosure will be described below.

FIG. 6 is a flowchart illustrating an operation of an electronic device according to various embodiments of the present disclosure.

Referring to FIG. 6, at operation S601, the electronic device 101 receives an input to at least one of a plurality of displays included in the electronic device 101.

For example, the electronic device 101 (shown in FIG. 4) may include the plurality of displays which are the first and second displays 461 and 462, and receive an input to at least one of the first and second displays 461 and 462. An input may be applied to a display by means of at least one touch made by an electronic pen or a user's body part. In addition, when the electronic device 101 receives an input, one or more of the first and second displays 461 and 462 may be in a turn-on state or a turn-off state.

At operation S603, the electronic device 101 senses the pressure of the received input.

The electronic device 101 may sense the pressure of an input to at least one of the plurality of displays through the pressure sensor 550 included in the electronic device 101.

At operation S605, if the sensed pressure is equal to or greater than a threshold, the electronic device 101, at operation S607, executes a first function in correspondence with the input.

If the sensed pressure is equal to or greater than the predetermined threshold, the electronic device 101 may execute the first function in correspondence with the input. For example, the electronic device 101 may enter an image adjust mode, as the first function, in order to adjust at least one of the size and position of at least one image displayed on the plurality of displays. In another example, the electronic device 101 may execute a function corresponding to the sensed pressure, as the first function. Various functions may be set as the function corresponding to the sensed pressure, as the first function. For example, as the first function, the electronic device 101 may execute a specific application, or display an image at a specific ratio on the display 160, in correspondence with the sensed pressure, which will be described below in greater detail.

On the contrary, if, at operation S605, the sensed pressure is less than the threshold, the electronic device 101, at operation S609, executes a second function in correspondence with the input.

If the sensed pressure is less than the threshold, the electronic device 101 may execute the second function in correspondence with the input. For example, the electronic device 101 may execute a function corresponding to the sensed input, as the second function. Specifically, the electronic device 101 may execute a function corresponding to one or more of the position and pattern of the sensed input. Therefore, the electronic device 101 may execute a function corresponding to a general input to a display, as the second function.

An operation method of an electronic device according to various embodiments of the present disclosure will be described with reference to FIGS. 7,8, 9A and 9B, 10A and 10B,11A and 11B,12A and 12B,13A and 13B,14,15A and 15B,16A and 16B,17A and 17B,18A and 18B,19A and 19B,20A and 20B,21A and 21B,22A and 22B,23A and 23B,24A and 24B,25A and 25B,26A and 26B, and 27 to 31.

Figure 7:
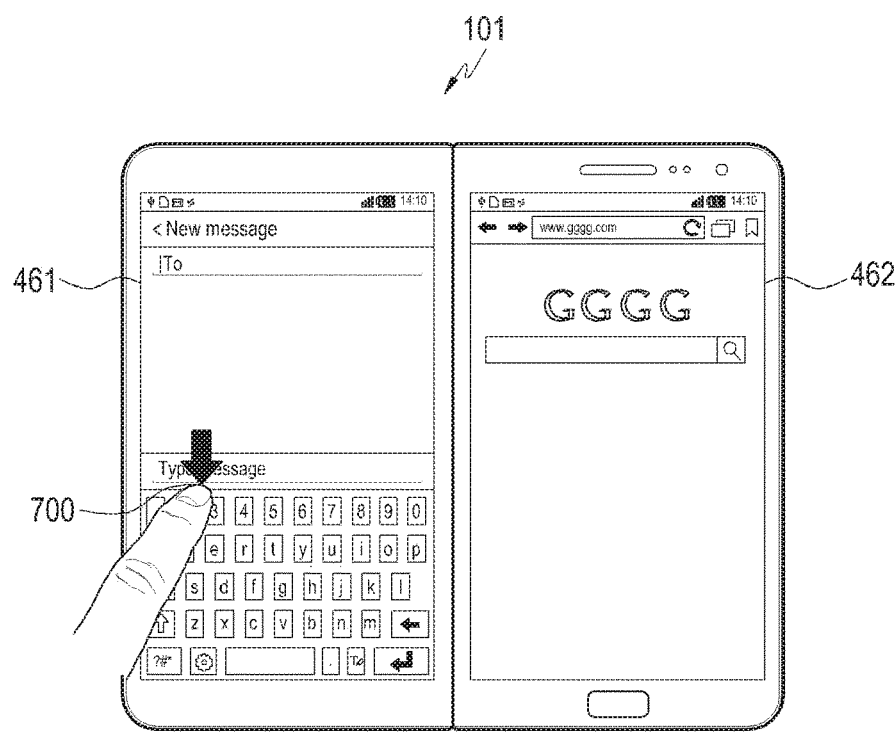
FIG. 7 is a view illustrating an input according to various embodiments of the present disclosure.

FIG. 7 is a view illustrating an input according to various embodiments of the present disclosure.

Referring to FIG. 7, the electronic device 101 may include the plurality of displays which are the first and second displays 461 and 462. The first display 461 may display a first image, and the second display 462 may display a second image. The first image may be an image corresponding to an SMS/MMS application 373, and the second image may be an image corresponding to a browser application 375. A description of the first and second images displayed on the first and second displays 461 and 462 are exemplary, and many other images may be displayed on the first and second displays 461 and 462. At least one of the first and second displays 461 and 462 may be in the turn-off state. The electronic device 101 may recognize a touch input 700 to a partial area of the first display 461. The pressure of the input 700 may be a first level equal to or greater than a threshold.

Referring to FIG. 7, the electronic device 101 may determine whether the pressure of the input 700 is equal to or greater than the predetermined threshold. If the pressure of the input 700 is equal to or greater than the threshold, the electronic device 101 may enter an image adjust mode, as the first function. The image adjust mode may refer to a mode in which at least one of the position and size of at least one image displayed on at least one display.

In an embodiment, when the electronic device 101 enters the image adjust mode, the electronic device 101 may reduce the size of an image being displayed on at least one display or shake the image as if the image were vibrating, in order to indicate that the image displayed on the at least one display is adjustable.

In another embodiment, even though the electronic device 101 enters the image adjust mode, the electronic device 101 may display an image unchanged on the display 160 before and after the image mode adjust mode.

This operation will be described in detail with reference to FIG. 8.

Figure 8:
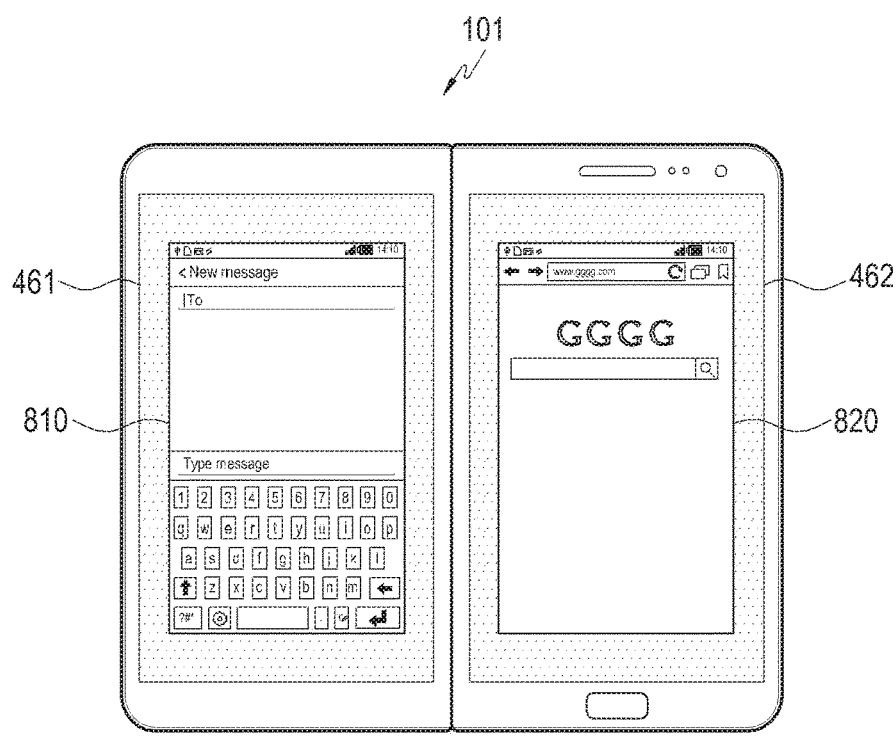
FIG. 8 is a view illustrating an electronic device placed in an image adjust mode according to various embodiments of the present disclosure.

FIG. 8 is a view illustrating an electronic device placed in the image adjust mode according to various embodiments of the present disclosure.

Referring to FIG. 8, once the electronic device 101 enters the image adjust mode, the electronic device 101 may display a first image layer 810 and a second image layer 820 which have been scaled down at a predetermined ratio from the first and second images displayed on the first and second displays 461 and 462, respectively. Also, the electronic device 101 may display the first and second image layers 810 and 820 on the first and second displays 461 and 462, three-dimensionally. Besides, once the electronic device 101 enters the image adjust mode, the electronic device 101 may display images on the first and second displays 461 and 462 in a different manner before and after the image adjust mode.

According to various embodiments of the present disclosure, the electronic device 101 may recognize an adjustment input for adjusting one or more of the position and size of at least one image displayed on at least one display 160 in the image adjust mode. The electronic device 101 may adjust one or more of the position and size of the at least one image displayed on the at least one display 160 in correspondence with the recognized adjustment input, and display the adjusted image.

The above operation will be described below with reference to FIGS. 9A and 9B, 10A and 10B, and 11A and 11B.

Figure 9A:
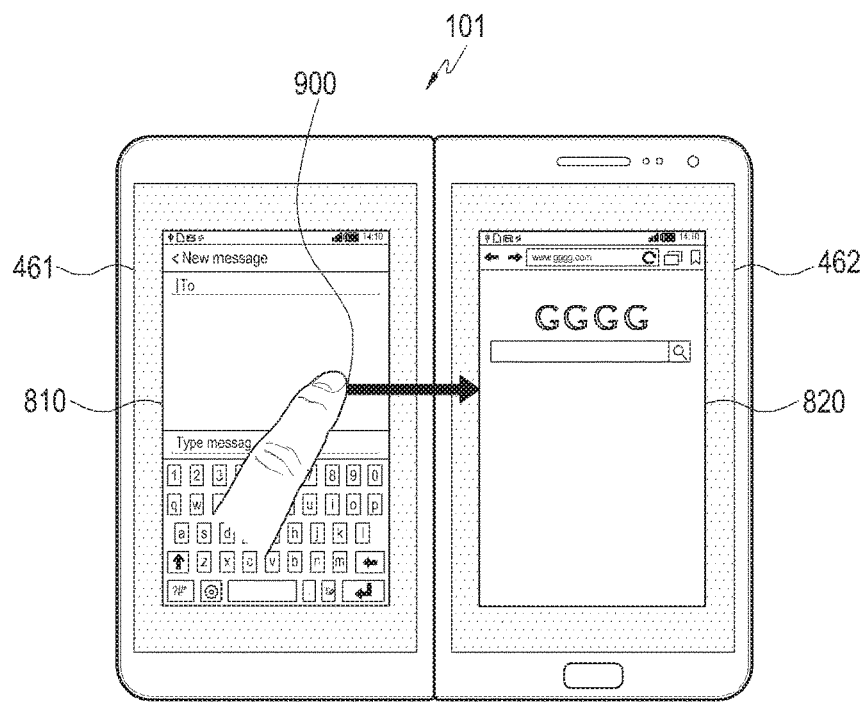
FIGS. 9A and 9B are views illustrating image shifting according to various embodiments of the present disclosure.
Figure 9B:
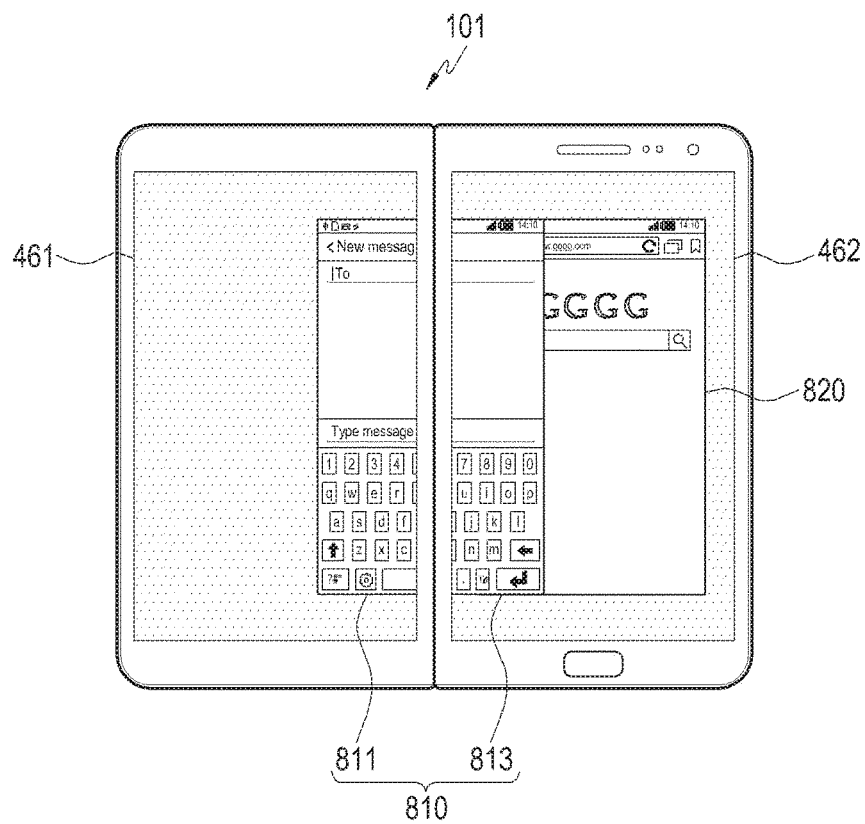

FIGS. 9A and 9B are views illustrating image shifting according to various embodiments of the present disclosure.

Referring to FIG. 9A, in the image adjust mode, the electronic device 101 may receive a drag-and-drop input 900 that drags a partial area of the first image layer 810 displayed on the first display 461 to the right and drops the partial area of the first image layer 810. Therefore, as illustrated in FIG. 9B, the electronic device 101 may display a part 811 of the first image layer 810 on the first display 461 and the other part 813 of the first image layer 810 on the second display 462, in correspondence with the drag-and-drop input 900. The electronic device 101 may display the other part 813 of the first image layer 810, overlapped with the second image layer 820. In this manner, the electronic device 101 may adjust the position of at least one image displayed on the plurality of displays 160 in correspondence with an input in the image adjust mode.

Figure 10A:
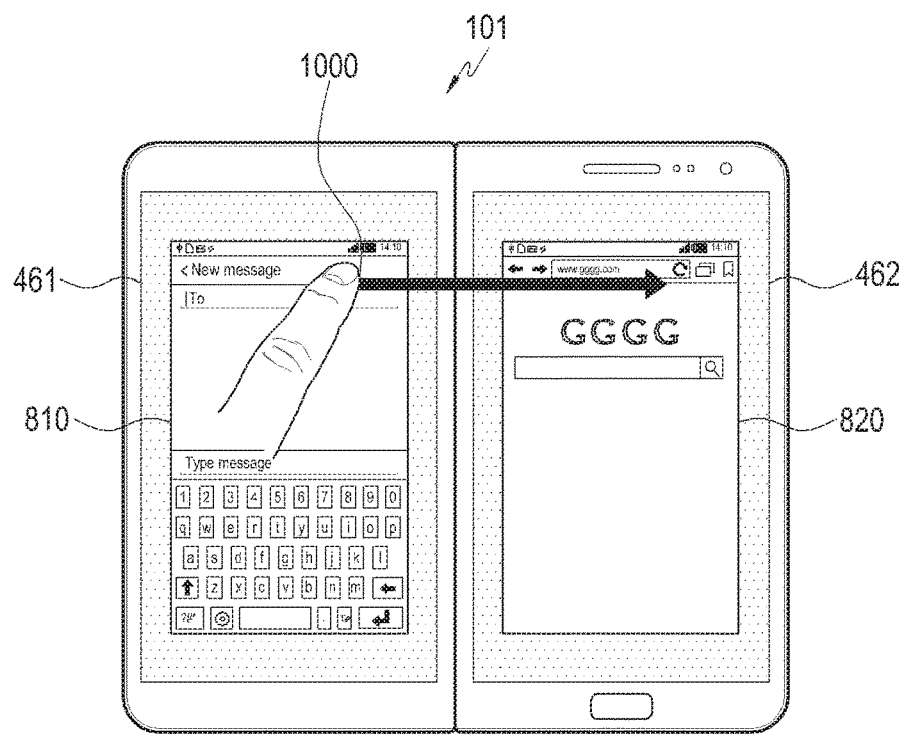
FIGS. 10A and 10B are views illustrating image shifting according to various embodiments of the present disclosure.
Figure 10B:
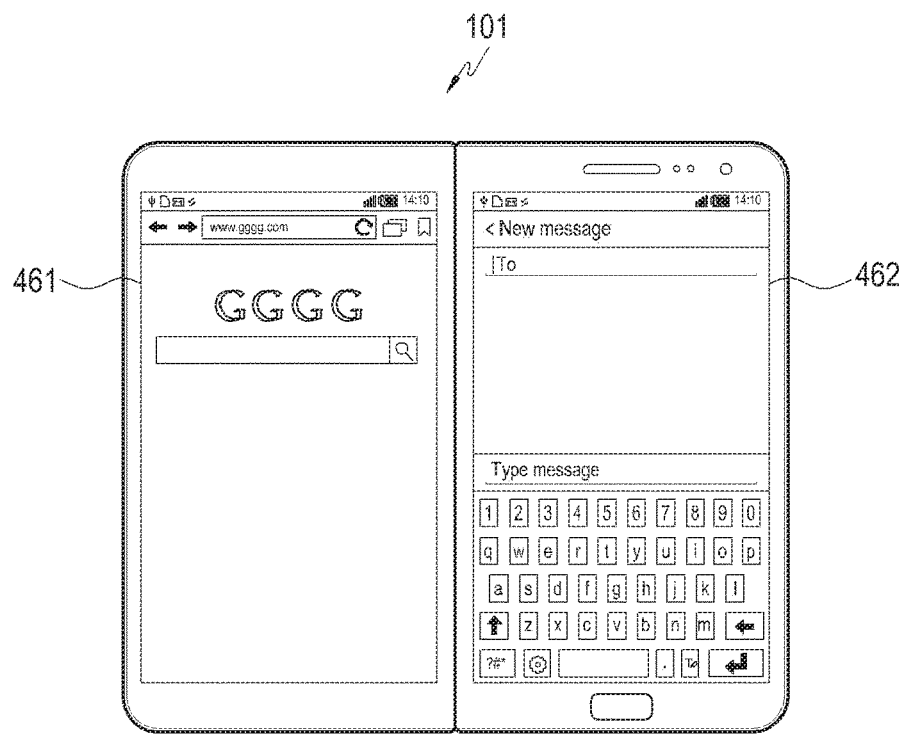

FIGS. 10A and 10B are views illustrating image shifting according to various embodiments of the present disclosure.

Referring to FIG. 10A, in the image adjust mode, the electronic device 101 may receive a drag-and-drop input 1000 that drags an upper end area of the first image layer 810 to an upper end area of the second image layer 820 and drops the upper end area of the first image layer 810. Therefore, as illustrated in FIG. 10B, the electronic device 101 may display the image corresponding to the SMS/MMS application 373 being the first image which has been displayed on the first display 461, on the second display 462, and an image corresponding to the browser application 375 being the second image which has been displayed on the second display 462, on the first display 461. In this manner, the electronic device 101 may exchange displayed images between a plurality of displays in correspondence with an input in the image adjust mode.

Figure 11A:
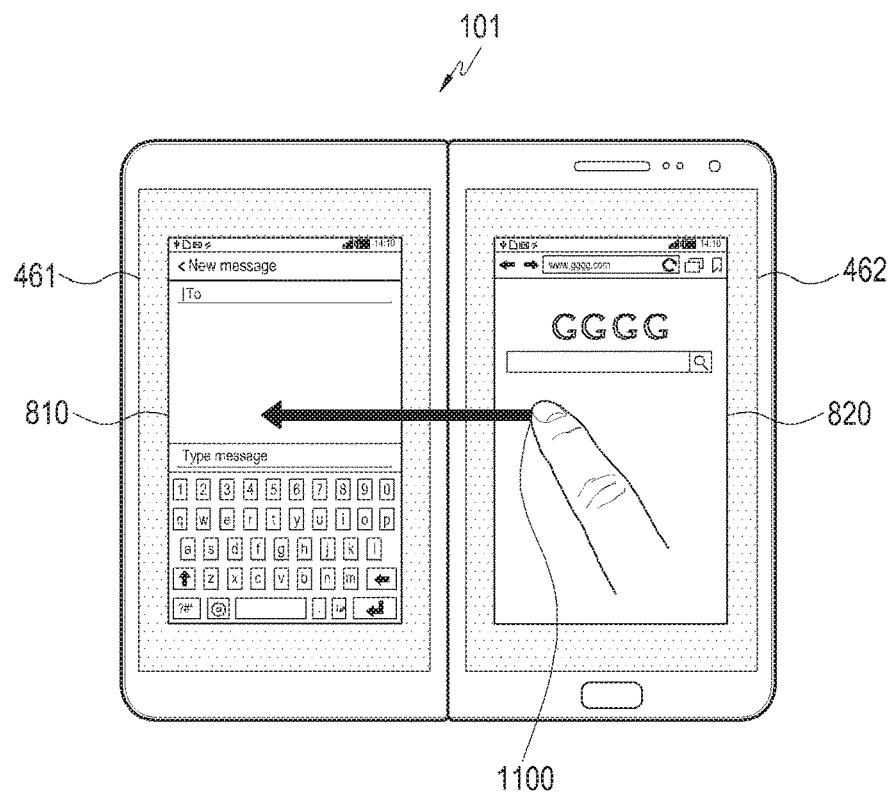
FIGS. 11A and 11B are views illustrating image size adjustment according to various embodiments of the present disclosure.
Figure 11B:
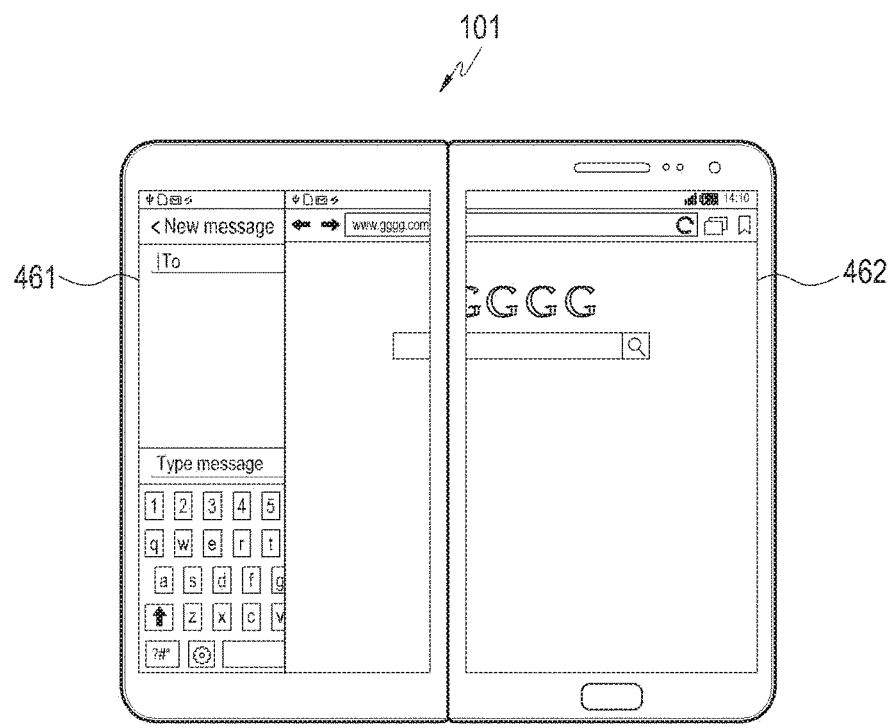

FIGS. 11A and 11B are views illustrating adjustment of an image size according to various embodiments of the present disclosure.

Referring to FIG. 11A, the electronic device 101 may receive a drag-and-drop input 1100 that drags a left boundary area of the second image layer 820 displayed on the second display 462 to the first display 461 and drops the left boundary area of the second image layer 820, as an input for adjusting the size of the image corresponding to the browser application 375 being the second image displayed on the second display 462. Therefore, as illustrated in FIG. 11B, the electronic device 101 may display the image corresponding to the browser application 375 being the second image across a partial area of the first display 461 and the second display 462.

In addition, the electronic device 101 may receive a double-tap touch input applied to a partial area of an image displayed on at least one of a plurality of displays, or a drag-and-drop input applied to the partial area to or beyond a predetermined reference, as an input for displaying an image corresponding to the input on all of the plurality of displays, in the image adjust mode.

This operation will be described below with reference to FIGS. 12A and 12B, and 13A and 13B.

Figure 12A:
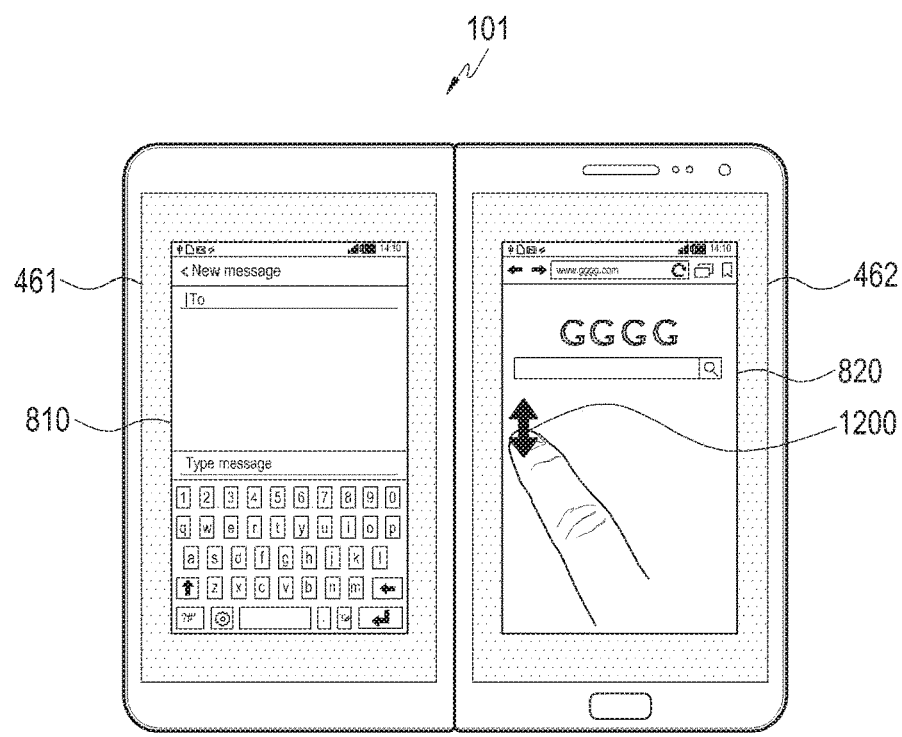
FIGS. 12A and 12B are views illustrating image size adjustment according to various embodiments of the present disclosure.
Figure 12B:
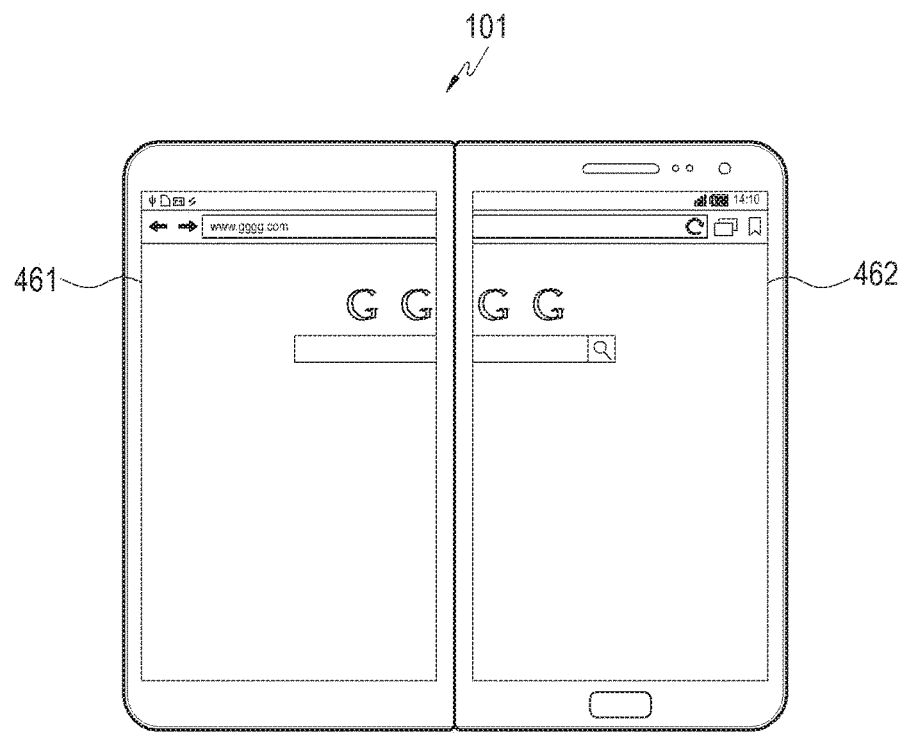

FIGS. 12A and 12B are views illustrating adjustment of an image size according to various embodiments of the present disclosure.

Referring to FIG. 12A, in the image adjust mode, the electronic device 101 may receive a double-tap input 1200 applied to a left boundary area of the second image layer 820 displayed on the second display 462 as an input for displaying the image corresponding to the browser application 375, that is, the second image across the entire first and second displays 461 and 462. Therefore, as illustrated in FIG. 12B, the electronic device 101 may display the image corresponding to the browser application 375, that is, the second image across the first and second displays 461 and 462.

Figure 13A:
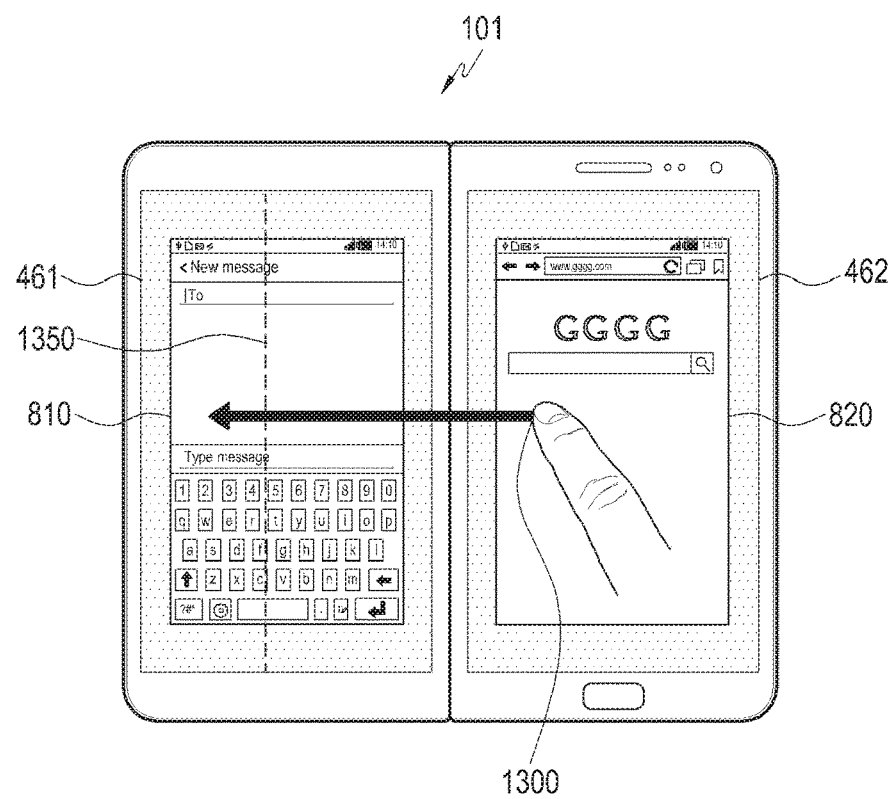
FIGS. 13A and 13B are views illustrating image size adjustment according to various embodiments of the present disclosure.
Figure 13B:
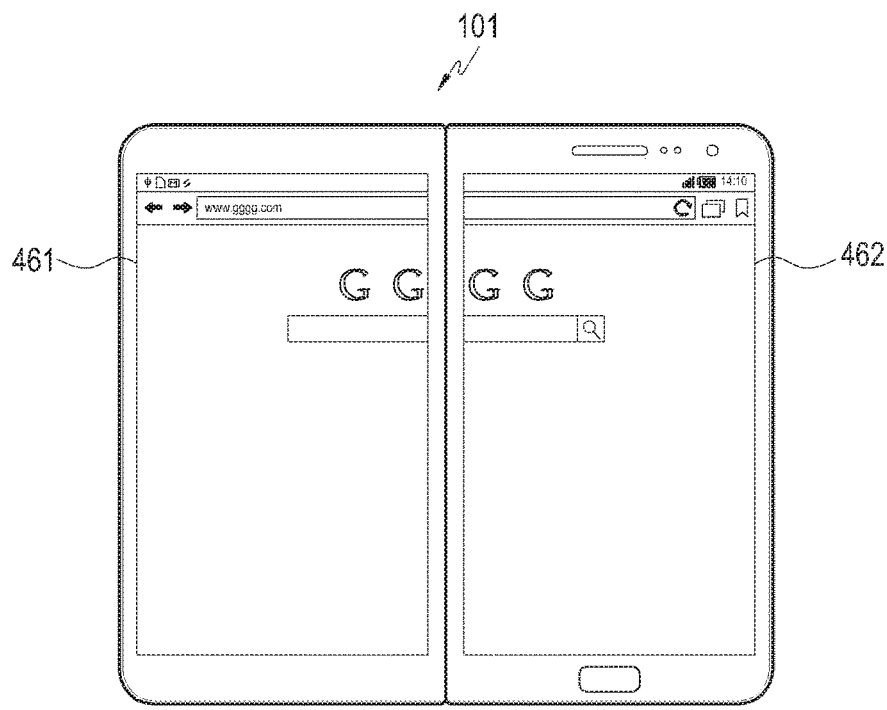

FIGS. 13A and 13B are views illustrating adjustment of an image size according to various embodiments of the present disclosure.

Referring to FIG. 13A, the electronic device 101 may receive a drag-and-drop input 1300 that drags a left boundary area of the second image layer 820 displayed on the second display 462 to the first display 461 and drops the left boundary area of the second image layer 820 in the image adjust mode. If the drag-and-drop input 1300 to the left boundary area of the second image layer 820 crosses a first reference line 820, the electronic device 101 may display an image corresponding to the input, that is, the second image across the entire first and second displays 461 and 462. Therefore, as illustrated in FIG. 13B, the electronic device 101 may display the image corresponding to the browser application 375, that is, the second image across the first and second displays 461 and 462. The electronic device 101 may or may not display the first reference line 1350 on the first display 461.

In addition, the electronic device 101 may display information about a ratio, size, and the like of an image to be adjusted in correspondence with an input for adjusting an image size on a display in the image adjust mode, which will be descried below with reference to FIG. 14.

Figure 14:
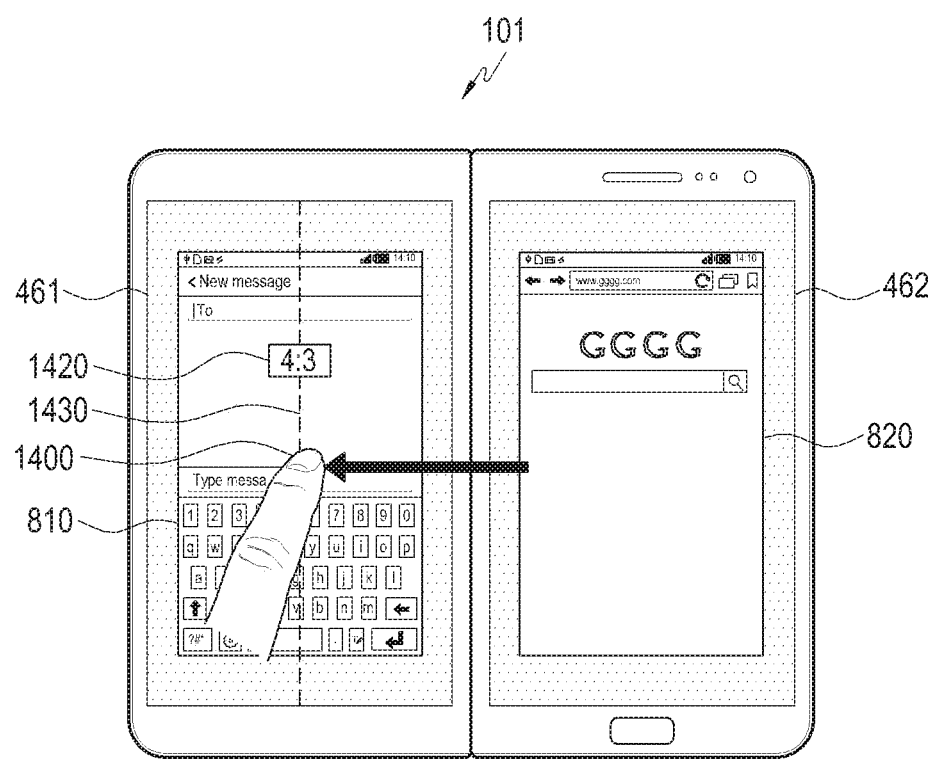
FIG. 14 is a view illustrating display of information about image size adjustment according to various embodiments of the present disclosure.

FIG. 14 is a view illustrating display of information about image size adjustment according to various embodiments of the present disclosure.

Referring to FIG. 14, upon receipt of a drag-and-drop input 1400 that drags a left boundary area of the second image layer 820 displayed on the second display 462 to the first display 461 and drops the left boundary of the second image layer 820 on the first display 461, the electronic device 101 may display an information window 1420 indicating a ratio of the second image to be displayed in correspondence with the input 1400. For example, if the ratio of the second image to be enlarged in correspondence with the input 1400 is 4:3, the electronic device 101 may display [4:3] in the information window 1420. Further, the electronic device 101 may display a virtual line 1430 matching the left edge of the second image to be enlarged in correspondence with the input 140. According to various embodiments of the present disclosure, the electronic device 101 may display information about at least one of the size, ratio, and the like of an image to be adjusted in correspondence with an image adjustment input in this manner.

The above description of the image adjust mode is exemplary, and should not be construed as limiting the present disclosure. Accordingly, the electronic device 101 may receive an image adjustment input in the state where an image is displayed on the display 160 in the same manner as before the image adjust mode, adjust at least one of the size, ratio, and the like of at least one image in correspondence with the image adjustment input, and display the adjusted image on the display 160 according to various embodiments of the present disclosure.

In addition, the electronic device 101 may execute a specific function in correspondence with the pressure of a received input according to various embodiments of the present disclosure. For example, the electronic device 101 may display an image at a specific ratio or in a specific direction in correspondence with the pressure of a received input. According to various embodiments of the present disclosure, the electronic device 101 may execute a specific application or a specific function in correspondence with the pressure of a received input.

The above operation will be described in detail with reference to FIGS. 15A and 15B,16A and 16B,17A and 17B,18A and 18B,19A and 19B,20A and 20B,21A and 21B,22A and 22B,23A and 23B,24A and 24B,25A and 25B, and 26A and 26B.

First, a description will be given of displaying images exchanged between displays.

Figure 15A:
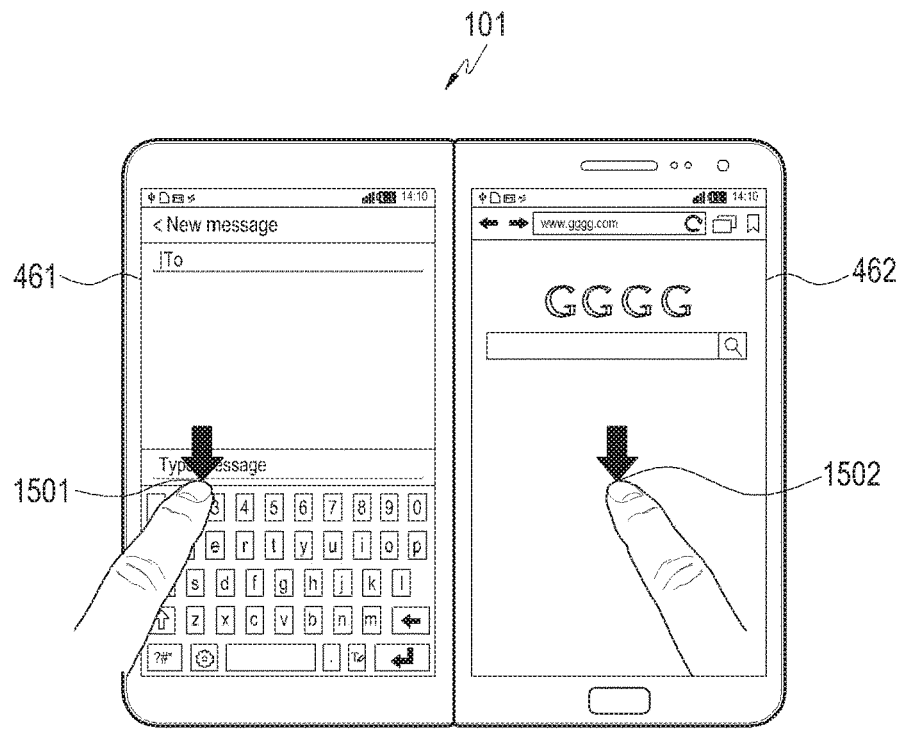
FIGS. 15A and 15B are views illustrating image exchange according to various embodiments of the present disclosure.
Figure 15B:
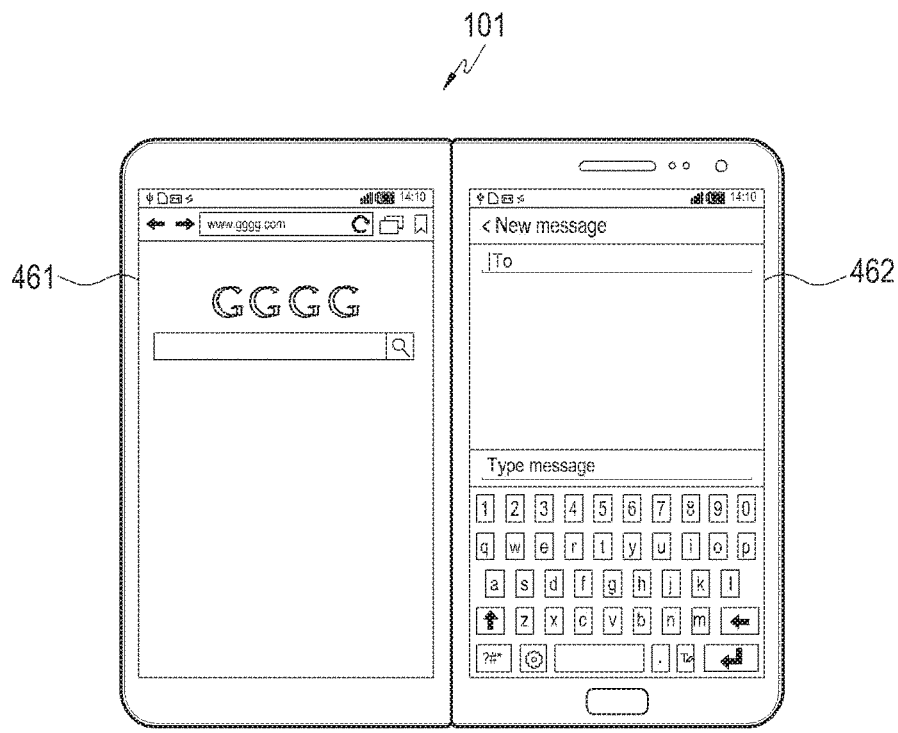

FIGS. 15A and 15B are views illustrating display of exchanged images according to various embodiments of the present disclosure.

Referring to FIG. 15A, the electronic device 101 may display the image corresponding to the SMS/MMS application 373 (shown in FIG. 3) as the first image on the first display 461, and the image corresponding to the browser application 375 (shown in FIG. 3) as the second image on the second display 462. The electronic device 101 may receive a first input 1501 being a touch on a partial area of the first display 461 and a second input 1502 being a touch on a partial area of the second display 462. The pressures of the first and second inputs 1501 and 1502 may be a second level equal to or greater than a threshold, or any other level. The electronic device 101 may exchange the plurality of images between the first and second displays 461 and 462 in correspondence with the first and second inputs 1501 and 1502 applied respectively to the first and second displays 461 and 462, and display the exchanged images on the first and second displays 461 and 462. For example, as illustrated in FIG. 15B, upon receipt of the first and second inputs 1501 and 1502, the electronic device 101 may display the first image, which has been displayed on the first display 461, on the second display 462, and the second image, which has been displayed on the second display 462, on the first display 461. According to various embodiments of the present disclosure, the electronic device 101 may exchange images between a plurality of displays and display the exchanged images on the displays, in correspondence with the pressure of an input without entering the image adjust mode.

Also, the electronic device 101 of the present disclosure may exchange a plurality of images displayed in different areas of the same display and display the exchanged images on the display, in correspondence with the pressures of inputs to the plurality of images.

This operation will be described below with reference to FIGS. 16A and 16B.

Figure 16A:
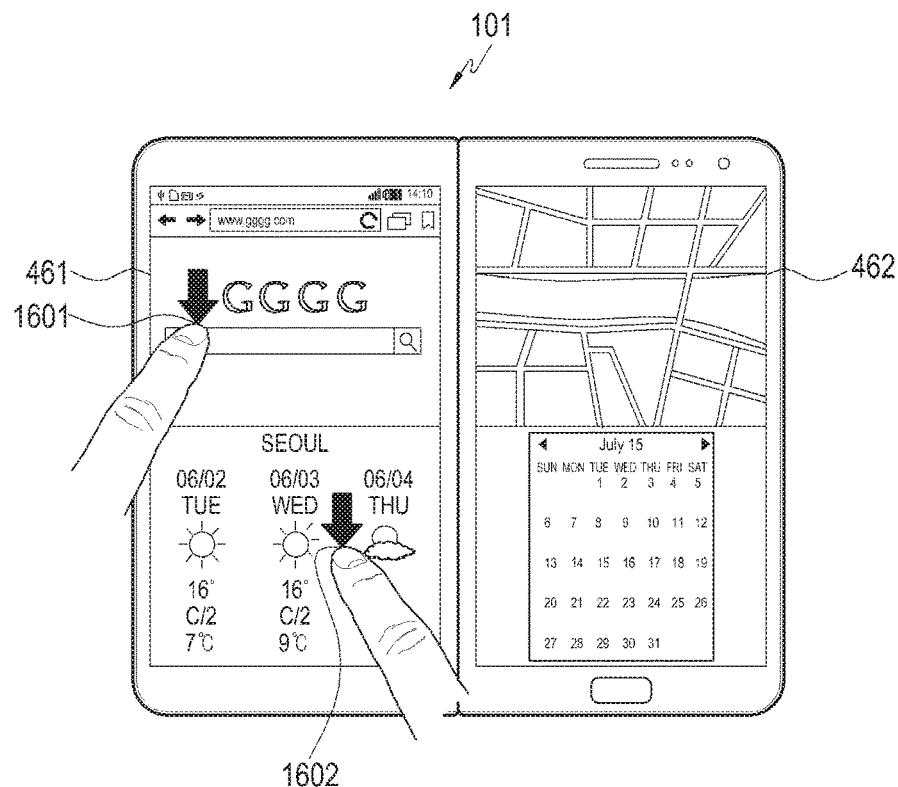
FIGS. 16A and 16B are views illustrating screen exchange according to various embodiments of the present disclosure.
Figure 16B:
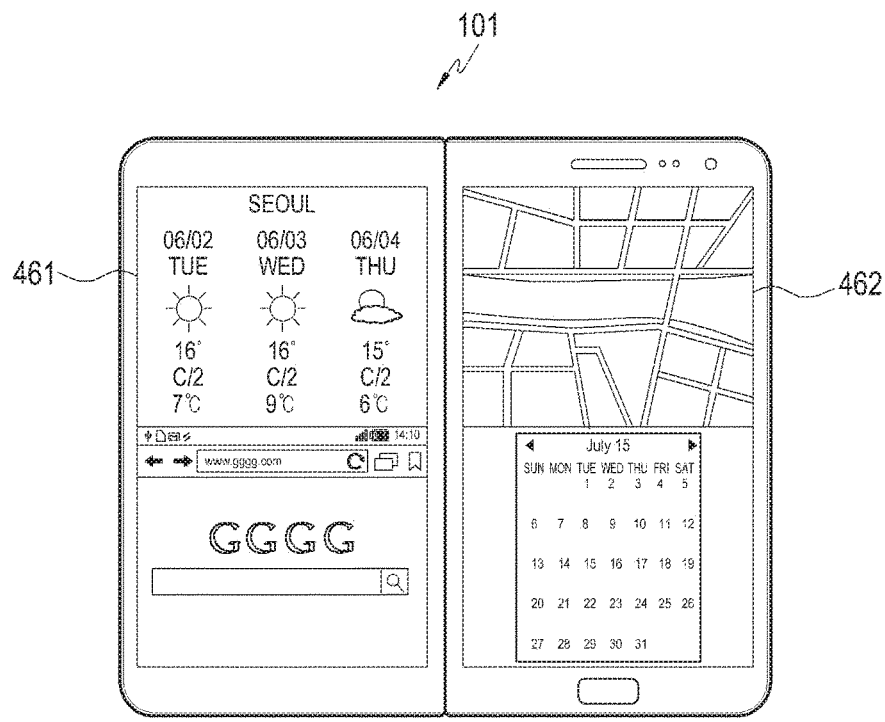

FIGS. 16A and 16B are views illustrating screen exchange according to various embodiments of the present disclosure.

Referring to FIG. 16A, the electronic device 101 may display the image corresponding to the browser application 375 as a first image and an image corresponding to a weather application as a second image on the first display 461, and display an image corresponding to a map application as a third image and an image corresponding to a calendar application 381 as a fourth application on the second display 462. The electronic device 101 may receive a first input 1601 being a touch on a partial area corresponding to the first image in the first display 461, and a second input 1602 being a touch on another partial area corresponding to the second image in the first display 461. The pressures of the first and second inputs 1601 and 1602 may be the second level equal to or greater than the threshold. The electronic device 101 may exchange the first image and the second image displayed on the first display 461 with each other in correspondence with the first and second inputs 1601 and 1602 applied to the first display 461. For example, as illustrated in FIG. 16B, upon receipt of the first and second inputs 1601 and 1602, the electronic device 101 may display the first image, which has been displayed in an upper part of the first display 461, in a lower part of the first display 461, and the second image, which has been displayed in the lower part of the first display 461, in the upper part of the first display 461. In this manner, the electronic device 101 according to various embodiments of the present disclosure may exchange the displayed positions of a plurality of images displayed on one display and display the images at the exchanged positions, in correspondence with the pressure of a received input.

In addition, the electronic device 101 of the present disclosure may display an image corresponding to an input on all of a plurality of displays in correspondence with the pressure of the input.

This operation will be described below with reference to FIGS. 17A and 17B.

Figure 17A:
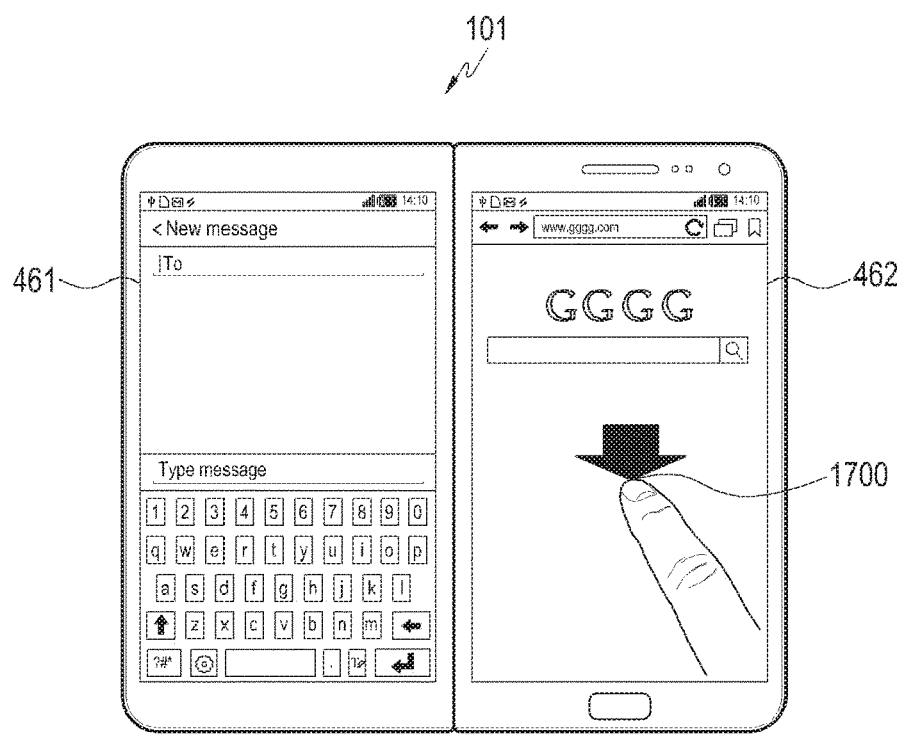
FIGS. 17A and 17B are views illustrating full image display according to various embodiments of the present disclosure.
Figure 17B:
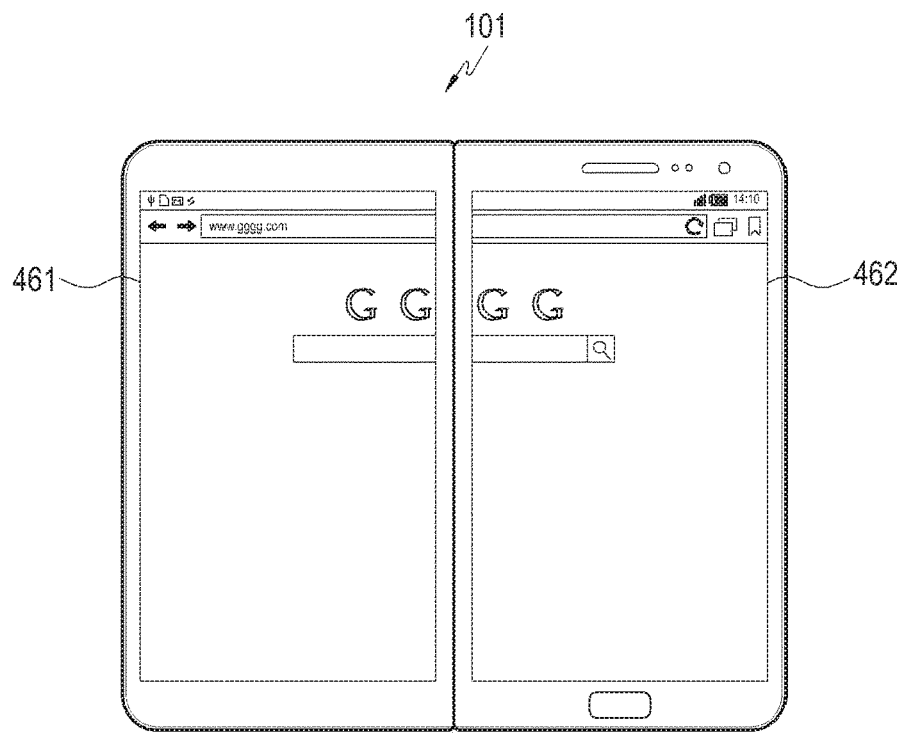

FIGS. 17A and 17B are views illustrating full image display according to various embodiments of the present disclosure.

Referring to FIG. 17A, the electronic device 101 may display the image corresponding to the SMS/MMS application 373 as the first image on the first display 461, and the image corresponding to the browser application 375 as the second image on the second display 462. The electronic device 101 may receive an input 1700 being a touch on a partial area of the second display 462. The pressure of the input 1700 may be a third level equal to or greater than the threshold, or any other level. The electronic device 101 may display the second image, which has been displayed on the second display 462, across the first and second displays 461 and 462. In this manner, the electronic device 101 according to various embodiments of the present disclosure may display an image displayed on one of a plurality of displays across the plurality of displays in correspondence with the pressure of a received input without entering the image adjust mode.

In addition, the electronic device 101 of the present disclosure may display an image in a size corresponding to the pressure of an input in a direction corresponding to the position of the input, in correspondence with the pressure and position of the input.

This operation will be described below in detail.

Figure 18A:
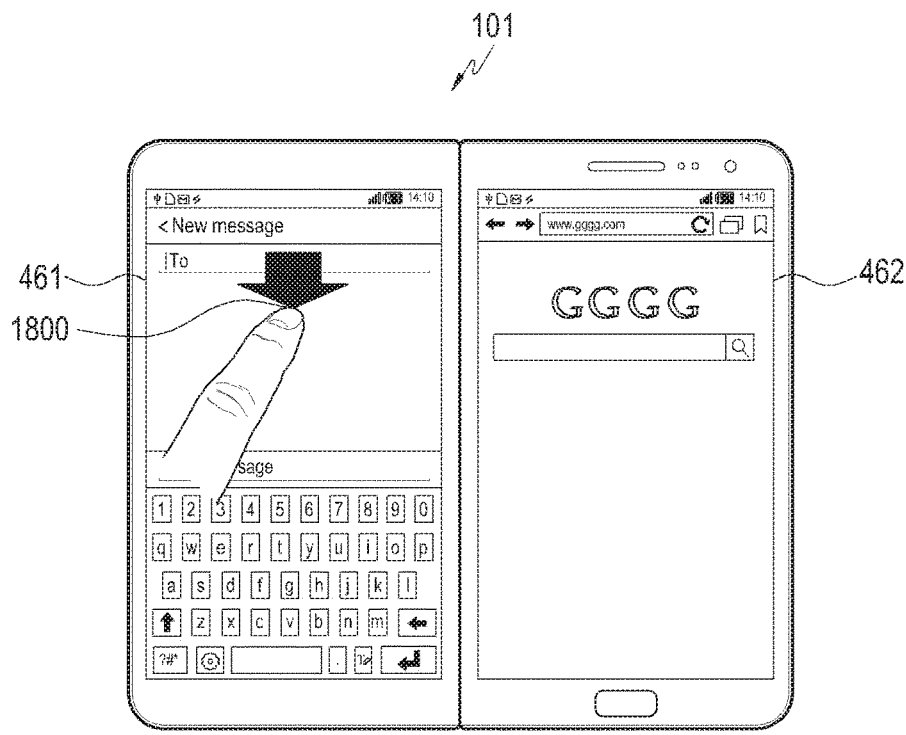
FIGS. 18A and 18B are views illustrating image adjustment corresponding to the position and pressure of an input according to various embodiments of the present disclosure.
Figure 18B:
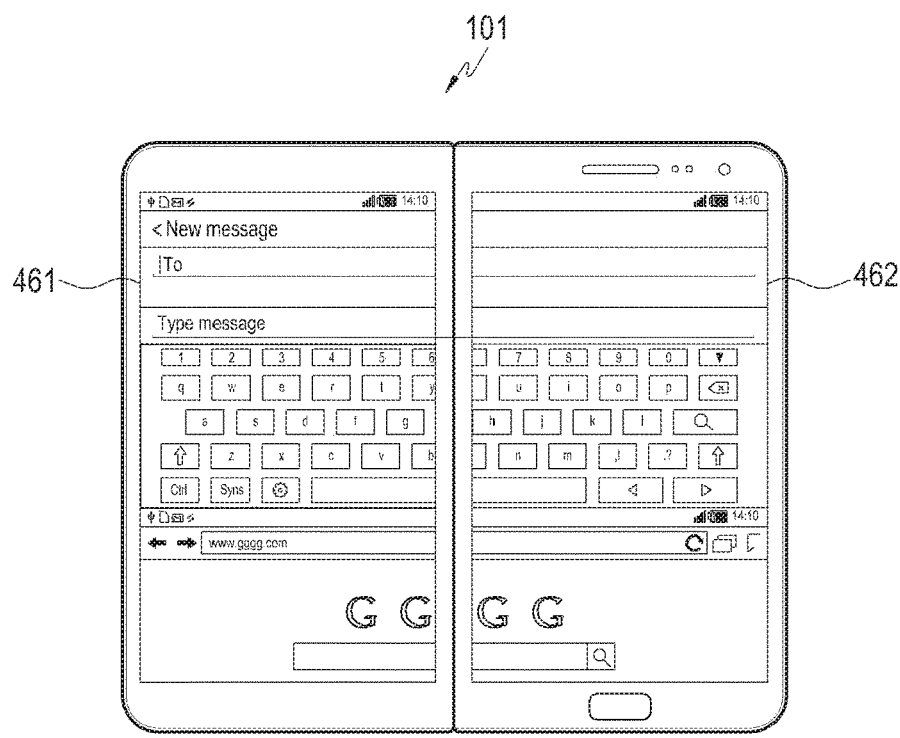

FIGS. 18A and 18B are views illustrating adjustment of an image in correspondence with the position and pressure of an input according to various embodiments of the present disclosure.

Referring to FIG. 18A, the electronic device 101 may display the image corresponding to the SMS/MMS application 373 (shown in FIG. 3) as the first image on the first display 461, and the image corresponding to the browser application 375 as the second image on the second display 462. The electronic device 101 may receive an input 1800 being a touch on a partial upper area of the first display 461. The pressure of the input 1800 may be the second level equal to or greater than the threshold, or any other level. The electronic device 101 may adjust at least one of the size and ratio of the first image in correspondence with the input 1800 to the first display 461. Accordingly, as illustrated in FIG. 18B, the electronic device 101 may display the image corresponding to the SMS/MMS application 373 as the first image in a horizontal direction in upper parts of the first and second displays 461 and 462. Also, the electronic device 101 may display the image corresponding to the browser application 375 as the second image in the horizontal direction in lower parts of the first and second displays 461 and 462.

Figure 19A:
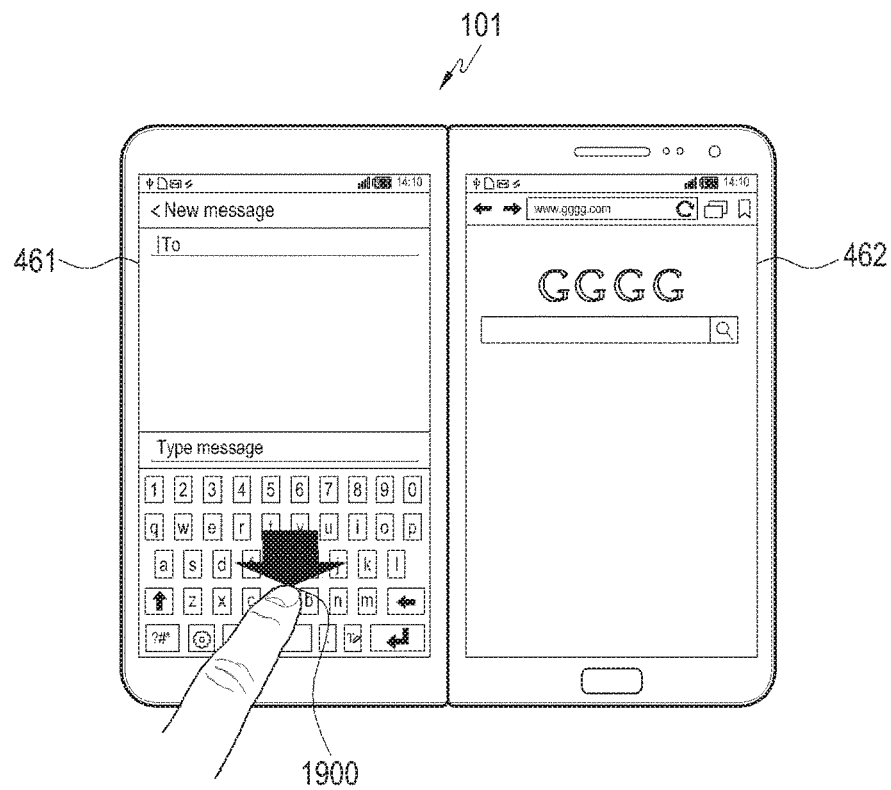
FIGS. 19A and 19B are views illustrating image adjustment corresponding to the position and pressure of an input according to various embodiments of the present disclosure.
Figure 19B:
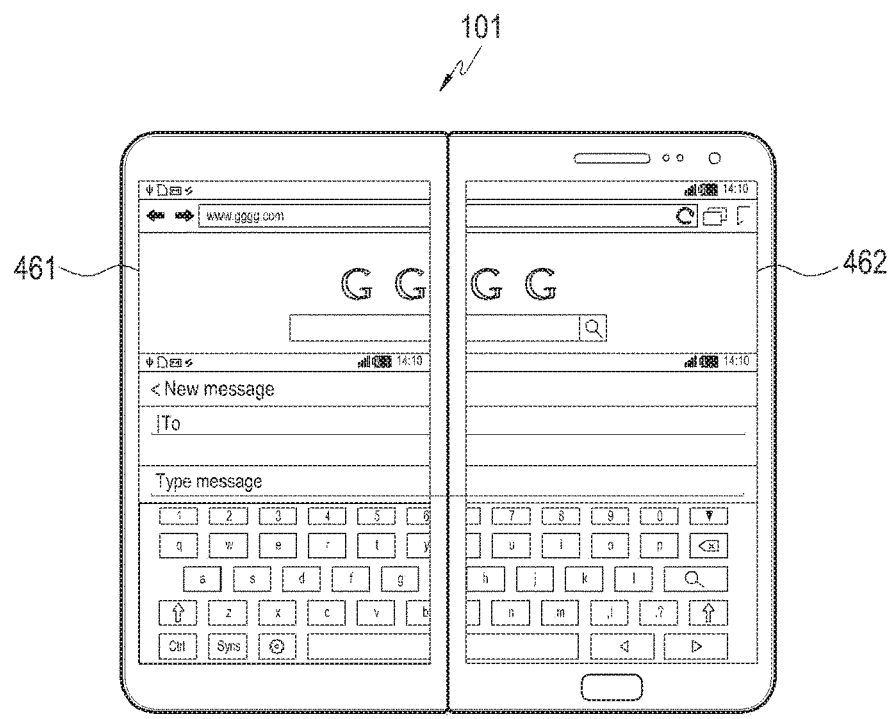

FIGS. 19A and 19B are views illustrating image adjustment corresponding to the position and pressure of an input according to various embodiments of the present disclosure.

Referring to FIG. 19A, the electronic device 101 may display the image corresponding to the SMS/MMS application 373 (shown in FIG. 3) as the first image on the first display 461, and the image corresponding to the browser application 375 as the second image on the second display 462. The electronic device 101 may receive an input 1900 being a touch on a partial lower area of the first display 461. The pressure of the input 1900 may be the second level equal to or greater than the threshold, or any other level. The electronic device 101 may adjust at least one of the size and ratio of the first image in correspondence with the input 1900 to the first display 461. Accordingly, as illustrated in FIG. 19B, the electronic device 101 may display the image corresponding to the SMS/MMS application 373 as the first image in the horizontal direction in lower parts of the first and second displays 461 and 462. Also, the electronic device 101 may display the image corresponding to the browser application 375 as the second image in the horizontal direction in upper parts of the first and second displays 461 and 462.

Figure 20A:
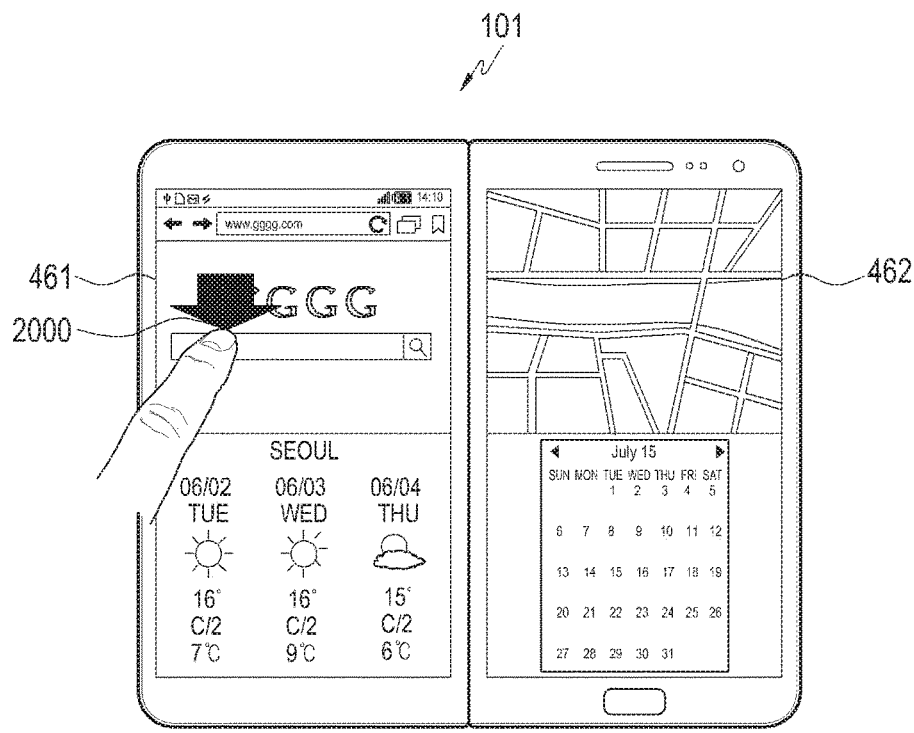
FIGS. 20A and 20B are views illustrating image adjustment corresponding to the position and pressure of an input according to various embodiments of the present disclosure.
Figure 20B:
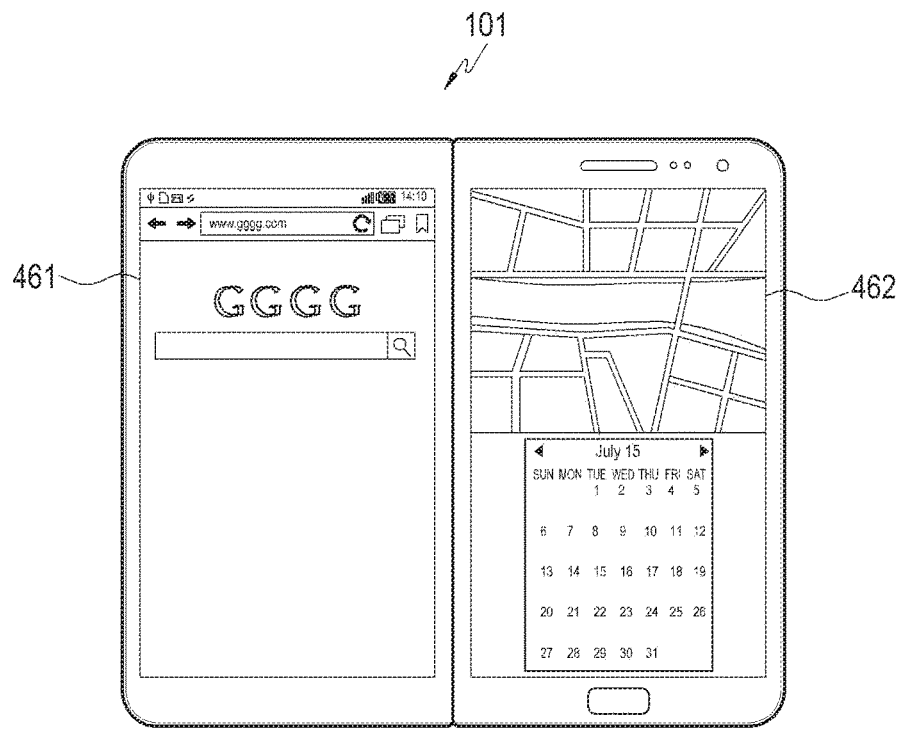

FIGS. 20A and 20B are views illustrating image adjustment corresponding to the position and pressure of an input according to various embodiments of the present disclosure.

Referring to FIG. 20A, the electronic device 101 may display the image corresponding to the SMS/MMS application 373 (shown in FIG. 3) as the first image and the image corresponding to the browser application 375 (shown in FIG. 3) as the second image on the first display 461, and display the image corresponding to the map application as the third image and the image corresponding to the calendar application 381 (shown in FIG. 3) as the fourth image on the second display 462. The electronic device 101 may receive an input 2000 being a touch on a partial area corresponding to the first image in the first display 461. The pressure of the input 2000 may be the second level equal to or greater than the threshold, or any other level. The electronic device 101 may adjust at least one of the size and ratio of the first image in correspondence with the input 2000 to the first display 461. For example, as illustrated in FIG. 20B, the electronic device 101 may display the first image, which has been displayed in an upper part of the first display 461, in full screen on the first display 461. In addition, the electronic device 101 may display the third and fourth images on the second display 462 in the same manner as before receiving the input 2000, or may display the second, third, and fourth images on the second display 462.

As described above, the electronic device 101 according to various embodiments of the present disclosure may display an image corresponding to an input to a size corresponding to the pressure of the input in a direction corresponding to the position of the input, in correspondence with the pressure and position of the received input without entering the image adjust mode.

In addition, the electronic device 101 according to various embodiments of the present disclosure may adjust and display an image in correspondence with the pressure and direction of an input applied to the image.

This operation will be described below with reference to FIGS. 21A and 21B, and 22A and 22B.

Figure 21A:
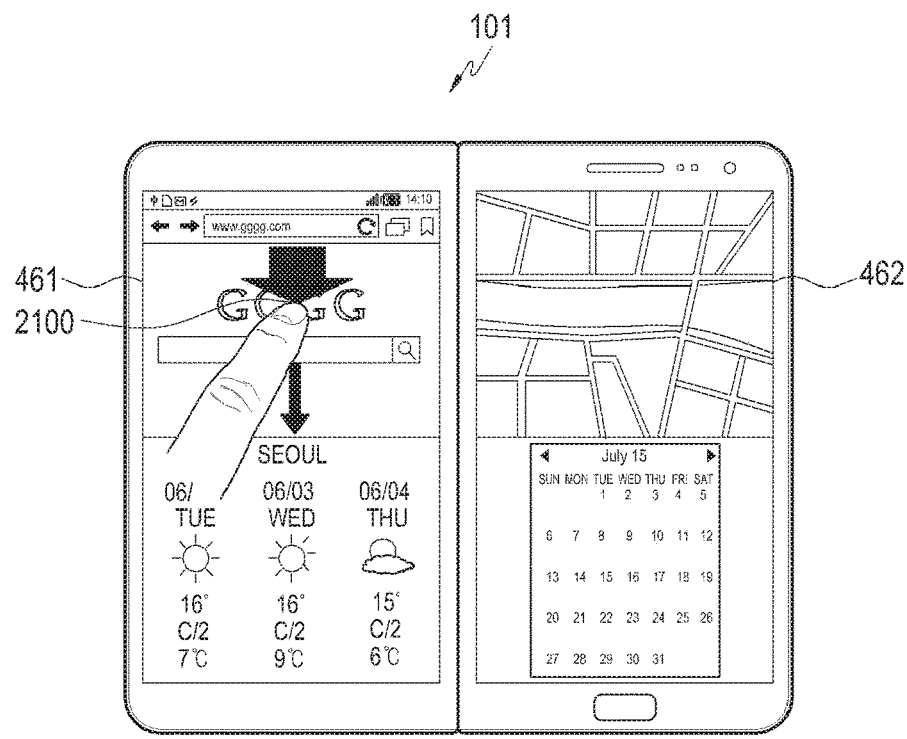
FIGS. 21A and 21B are views illustrating image adjustment corresponding to the pressure and direction of an input according to various embodiments of the present disclosure.
Figure 21B:
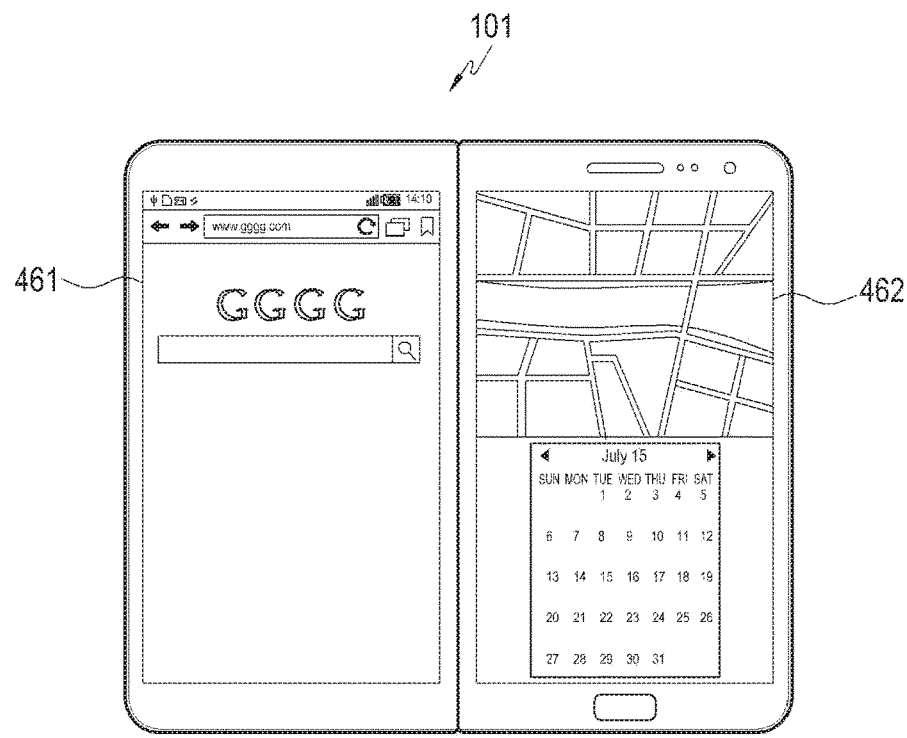

FIGS. 21A and 21B are views illustrating image adjustment corresponding to the pressure and direction of an input according to various embodiments of the present disclosure.

Referring to FIG. 21A, the electronic device 101 may display the image corresponding to the browser application 375 (shown in FIG. 3) as the first image and the image corresponding to the weather application as the second image on the first display 461, and display the image corresponding to the map application as the third image and the image corresponding to the calendar application as the fourth image on the second display 462. The electronic device 101 may receive an input 2100 being a downward swipe of a partial area corresponding to the first image in the first display 461. The pressure of the input 2100 may be the second level equal to or greater than the threshold or any other level. The pressure of the input 2100 may be maintained at the second level during the swipe, or may be the second level only at the start of the swipe. The electronic device 101 may adjust at least one of the size and ratio of the first image displayed on the first display 461 and display the adjusted image, in correspondence with the input 2100 to the first display 461. For example, as illustrated in FIG. 21B, the electronic device 101 may display the first image, which has been displayed in an upper part of the first display 461, in full screen on the first display 461. In addition, the electronic device 101 may display the third and fourth images on the second display 462 in the same manner as before receiving the input 2100, or may display the second, third, and fourth images on the second display 462.

Figure 22A:
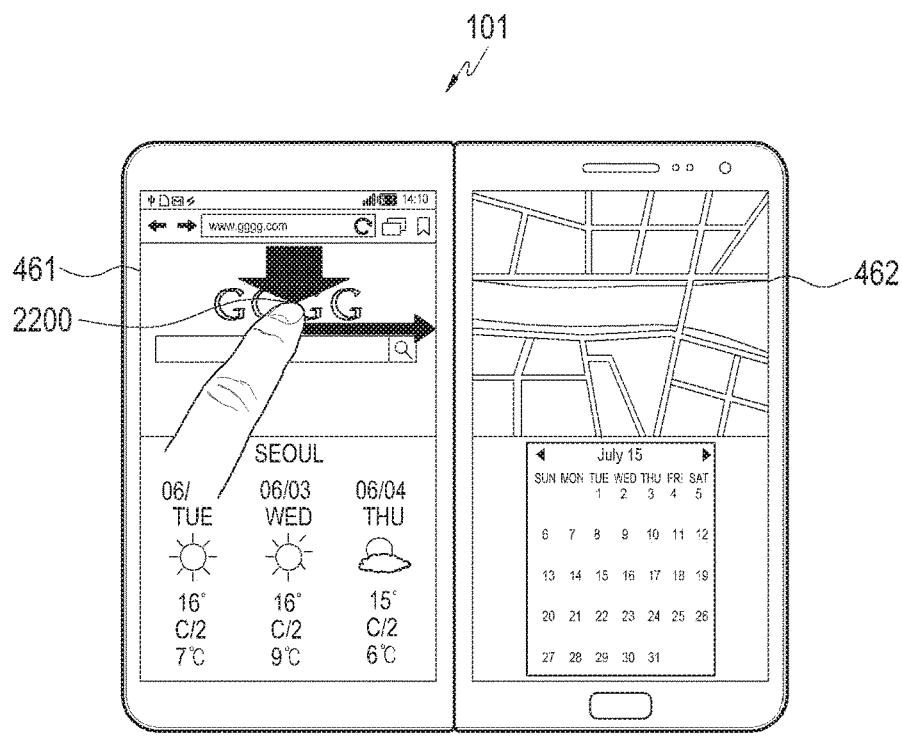
FIGS. 22A and 22B are views illustrating image adjustment corresponding to the pressure and direction of an input according to various embodiments of the present disclosure.
Figure 22B:
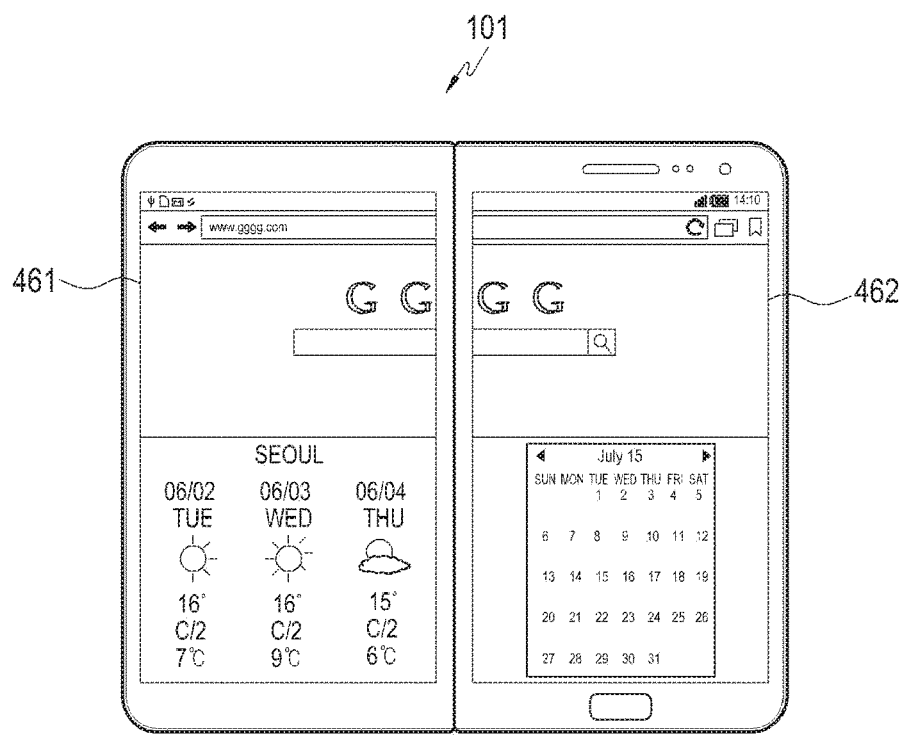

FIGS. 22A and 22B are views illustrating image adjustment corresponding to the pressure and direction of an input according to various embodiments of the present disclosure.

Referring to FIG. 22A, the electronic device 101 may display the image corresponding to the browser application 375 (shown in FIG. 3) as the first image and the image corresponding to the weather application as the second image on the first display 461, and display the image corresponding to the map application as the third image and the image corresponding to the calendar application 381 (shown in FIG. 3) as the fourth image on the second display 462. The electronic device 101 may receive an input 2200 being a right swipe of a partial area corresponding to the first image in the first display 461. The pressure of the input 2200 may be the second level equal to or greater than the threshold or any other level. The pressure of the input 2200 may be maintained at the second level during the swipe, or may be the second level only at the start of the swipe. The electronic device 101 may adjust at least one of the size and ratio of the first image displayed on the first display 461 and display the adjusted image, in correspondence with the input 2200 to the first display 461. For example, as illustrated in FIG. 22B, the electronic device 101 may display the first image, which has been displayed in an upper part of the first display 461, across upper parts of the first and second displays 461 and 462. Also, the electronic device 101 may display the second image in a lower part of the first display 461, and the fourth image in a lower part of the second display 462. Or the electronic device 101 may display the second, third, and fourth images in the lower parts of the first and second displays 461 and 462.

In addition, the electronic device 101 according to various embodiments of the present disclosure may execute a predetermined function in correspondence with the pressure of an input to at least one of a plurality of displays.

This operation will be described below with reference to FIGS. 23A and 23B, 24A and 24B, 25A and 25B, and 26A and 26B.

Figure 23A:
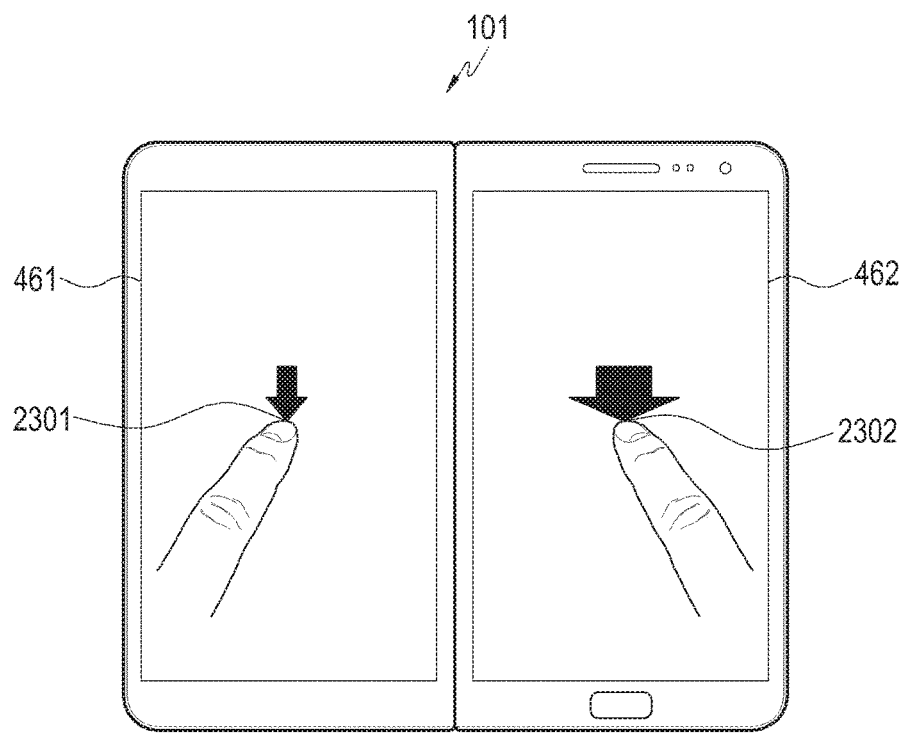
FIGS. 23A and 23B are views illustrating execution of an application corresponding to the pressure of an input according to various embodiments of the present disclosure.
Figure 23B:
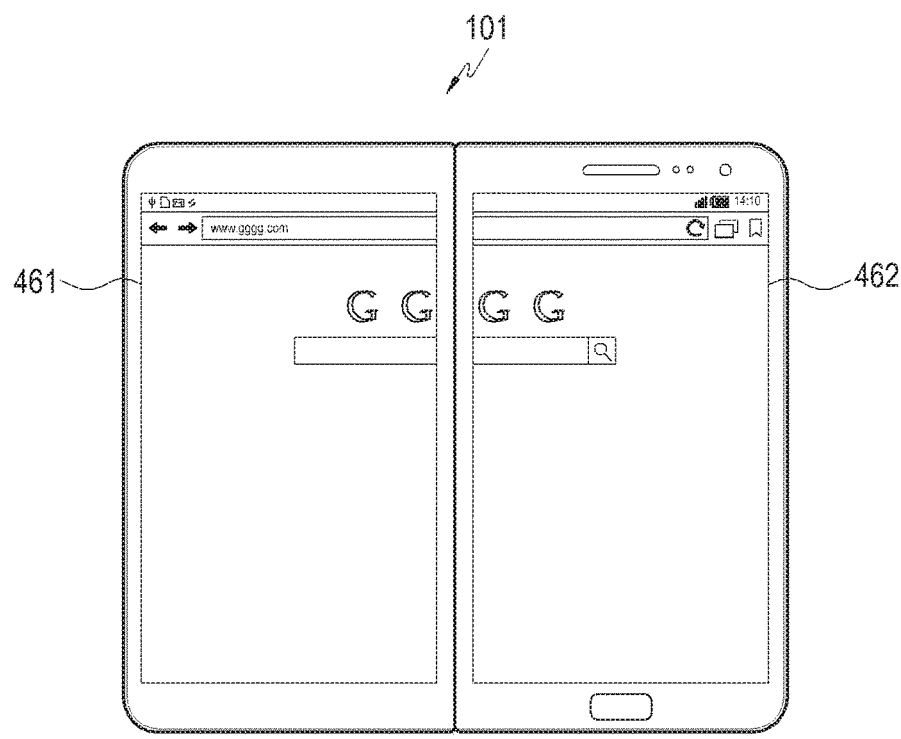

FIGS. 23A and 23B are views illustrating execution of an application corresponding to the pressure of an input according to various embodiments of the present disclosure.

Referring to FIG. 23A, the electronic device 101 may receive a first input 2301 being a touch on a partial area of the first display 461, and a second input 2302 being a touch on a partial area of the second display 462. Herein, the first and second displays 461 and 462 are in the turn-on or turn-off state. The pressure of the first input 2301 may be a fourth level and the pressure of the second input 2302 may be a fifth level. The pressure of each of the first and second inputs 2301 and 2302 may be equal to or greater than, or equal to or less than the threshold. The electronic device 101 may execute an application in correspondence with the pressures of the first and second inputs 2301 and 2302. For example, as illustrated in FIG. 23B, the electronic device 101 may execute the browser application 375 (shown in FIG. 3) being an application corresponding to the pressure of the first input 2301, that is, the fourth level and the pressure of the second input 2302, that is, the fifth level. Accordingly, the electronic device 101 may display the image corresponding to the browser application 375 (shown in FIG. 3) across the first and second display 461 and 462. The above description of execution of an application corresponding to the pressure of an input is exemplary and should not be construed as limiting the present disclosure. Therefore, it is to be understood that the electronic device 101 according to various embodiments of the present disclosure may execute various applications corresponding to the pressure of an input according to selection of a user or a designer.

Figure 24A:
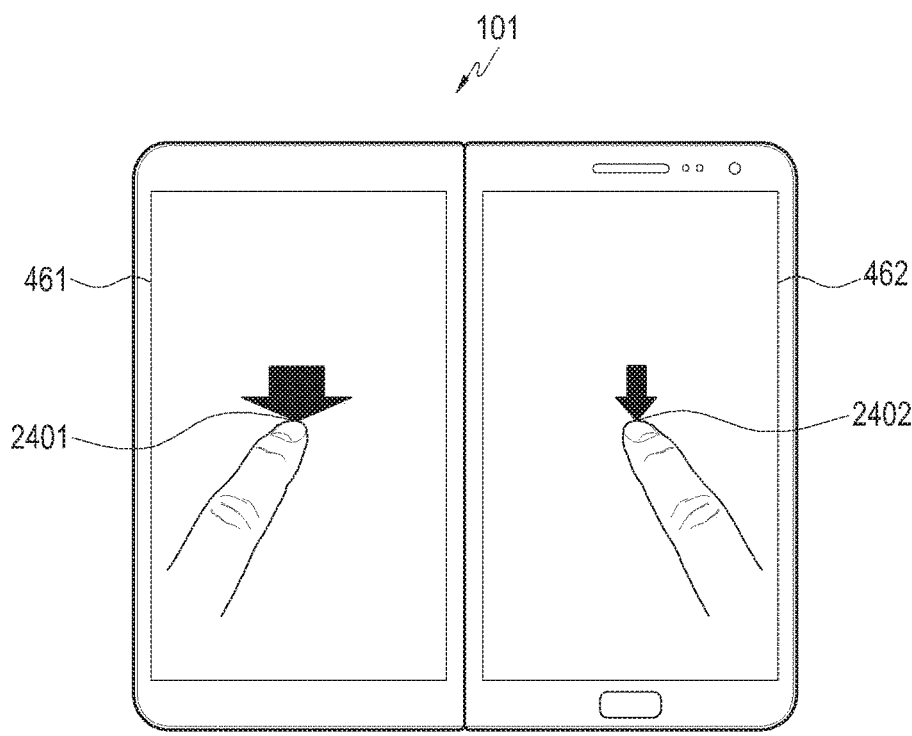
FIGS. 24A and 24B are views illustrating execution of a function corresponding to the pressure of an input according to various embodiments of the present disclosure.
Figure 24B:
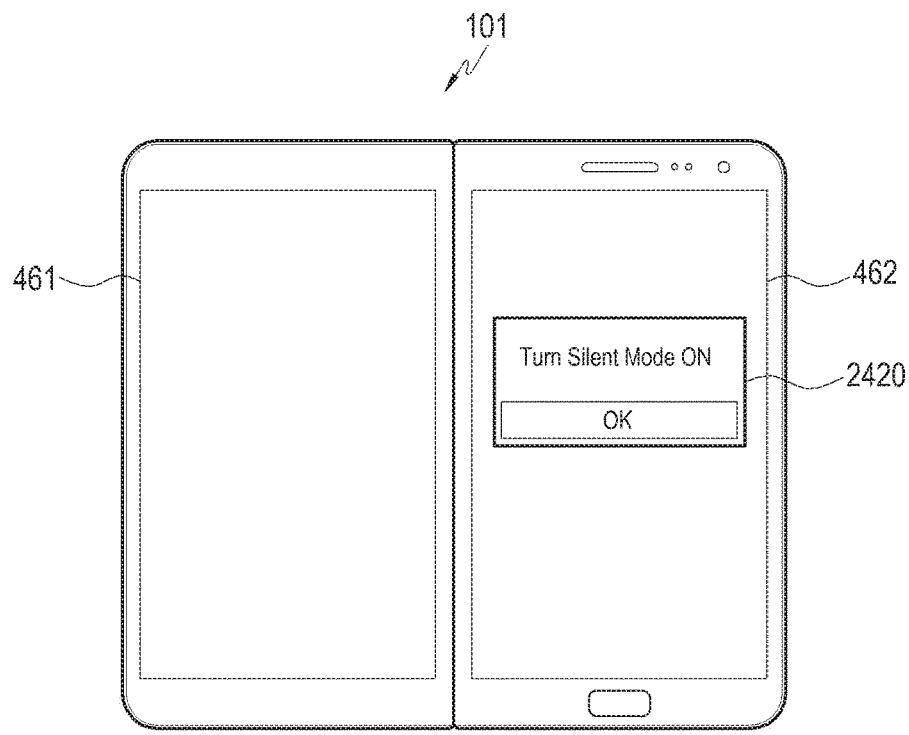

FIGS. 24A and 24B are views illustrating execution of a function corresponding to the pressure of an input according to various embodiments of the present disclosure.

Referring to FIG. 24A, the electronic device 101 may receive a first input 2401 being a touch on a partial area of the first display 461, and a second input 2402 being a touch on a partial area of the second display 462. Herein, the first and second displays 461 and 462 are in the turn-on or turn-off state. The pressure of the first input 2401 may be the fifth level and the pressure of the second input 2402 may be the fourth level. The pressure of each of the first and second inputs 2401 and 2402 may be equal to or greater than, or equal to or less than the threshold. The electronic device 101 may execute a function in correspondence with the pressures of the first and second inputs 2301 and 2302. For example, as illustrated in FIG. 24B, the electronic device 101 may switch to a silent mode as a function corresponding to the pressure of the first input 2401, that is, the fifth level and the pressure of the second input 2402, that is, the fourth level. Accordingly, the electronic device 101 may neither output a sound nor generate vibrations or a haptic effect. Also, the electronic device 101 may display an information window 2420 indicating switching to the silent mode. The above description of execution of a function corresponding to the pressure of an input is purely exemplary and thus should not be construed as limiting the present disclosure. Therefore, it is to be understood that the electronic device 101 according to various embodiments of the present disclosure may execute various functions corresponding to the pressure of an input according to selection of a user or a designer.

Figure 25A:
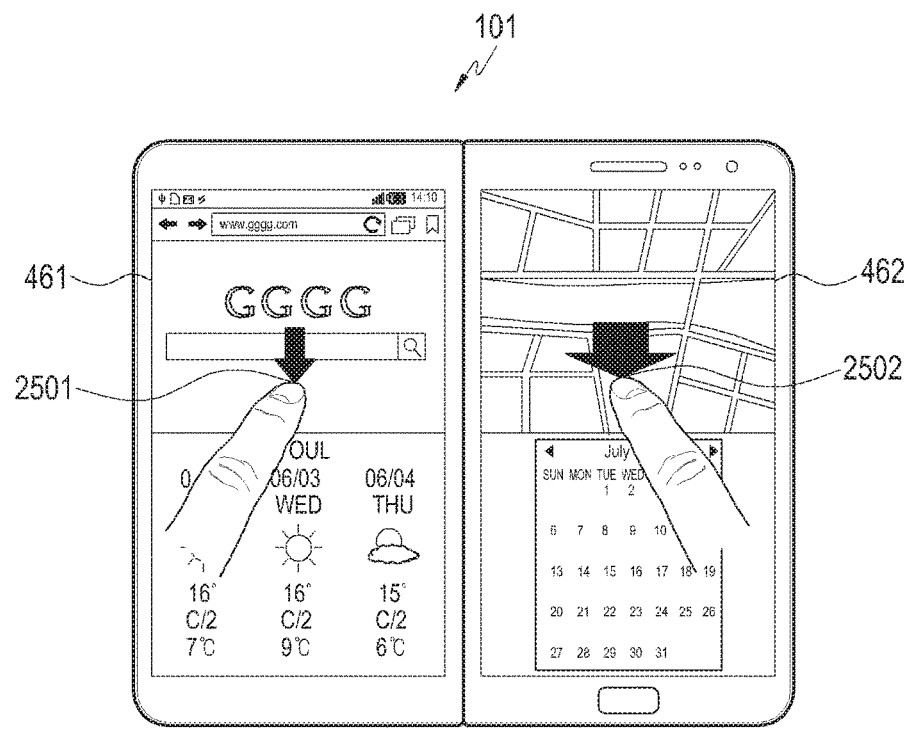
FIGS. 25A and 25B are views illustrating screen division corresponding to the pressure of an input according to various embodiments of the present disclosure.
Figure 25B:
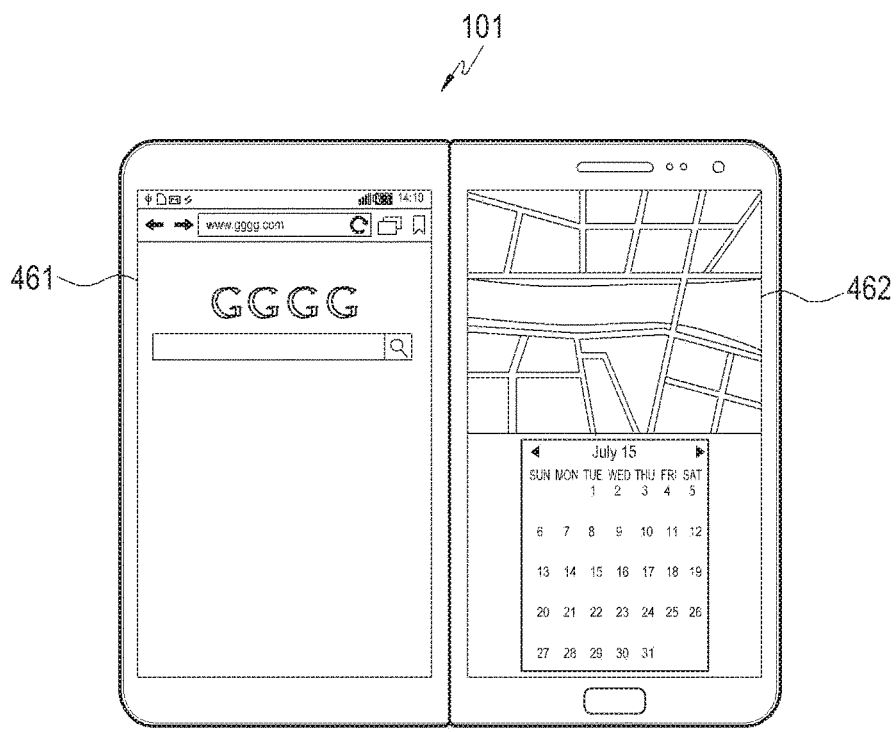

FIGS. 25A and 25B are views illustrating screen division corresponding to the pressure of an input according to various embodiments of the present disclosure.

Referring to FIG. 25A, the electronic device 101 may display the image corresponding to the browser application 375 (shown in FIG. 3) as the first image and the image corresponding to the weather application as the second image on the first display 461, and display the image corresponding to the map application as the third image and the image corresponding to the calendar application 381 (shown in FIG. 3) as the fourth image on the second display 462. The electronic device 101 may receive a first input 2501 being a touch on a partial area of the first display 461, and a second input 2502 being a touch on a partial area of the second display 462. The pressure of the first input 2501 may be the fourth level and the pressure of the second input 2502 may be a sixth level. The pressure of each of the first and second inputs 2501 and 2502 may be equal to or greater than, or equal to or less than the threshold. The electronic device 101 may execute a function in correspondence with the pressures of the first and second inputs 2501 and 2502. For example, as illustrated in FIG. 25B, the electronic device 101 may display a screen divided at a ratio corresponding to the pressure of the first input 2301, that is, the fourth level and the pressure of the second input 2302, that is, the sixth level on at least one of the first and second displays 461 and 462. Accordingly, the electronic device 101 may display the first image in full screen on the first display 461, and display the third image in an upper part of the second display 462 and the fourth image in a lower part of the second display 462, on a screen divided at the ratio corresponding to the pressure of the first input 2501, that is, the fourth level and the pressure of the second input 2502, that is, the sixth level.

Figure 26A:
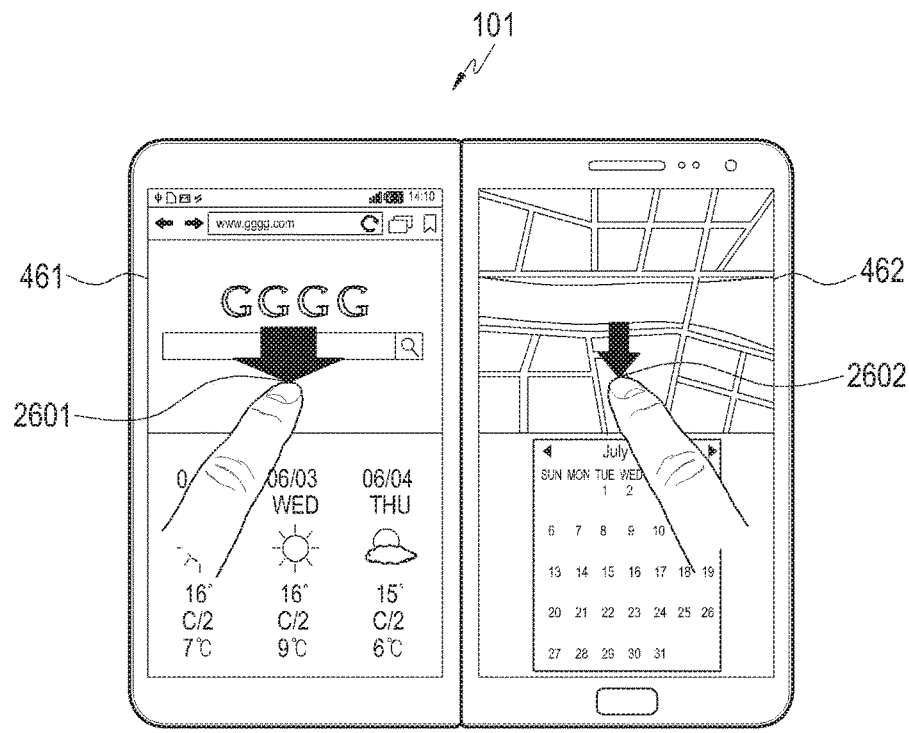
FIGS. 26A and 26B are views illustrating screen division corresponding to the pressure of an input according to various embodiments of the present disclosure.
Figure 26B:
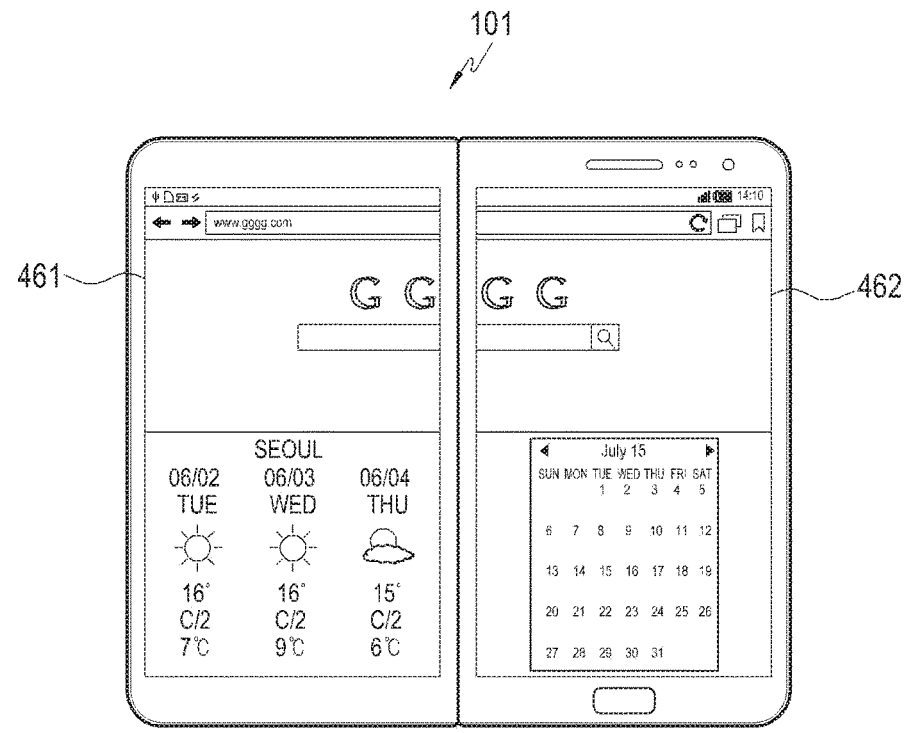

FIGS. 26A and 26B are views illustrating screen division corresponding to the pressure of an input according to various embodiments of the present disclosure.

Referring to FIG. 26A, the electronic device 101 may display the image corresponding to the browser application 375 (shown in FIG. 3) as the first image and the image corresponding to the weather application as the second image on the first display 461, and display the image corresponding to the map application as the third image and the image corresponding to the calendar application 381 (shown in FIG. 3) as the fourth image on the second display 462. The electronic device 101 may receive a first input 2601 being a touch on a partial area of the first display 461, and a second input 2602 being a touch on a partial area of the second display 462. The pressure of the first input 2601 may be the fifth level and the pressure of the second input 2602 may be the fourth level. The pressure of each of the first and second inputs 2601 and 2602 may be equal to or greater than, or equal to or less than the threshold. The electronic device 101 may execute a function corresponding to the pressures of the first and second inputs 2601 and 2602. For example, as illustrated in FIG. 26B, the electronic device 101 may display a screen divided at a ratio corresponding to the pressure of the first input 2601, that is, the fifth level and the pressure of the second input 2602, that is, the fourth level on at least one of the first and second displays 461 and 462. Accordingly, the electronic device 101 may display the first image across upper parts of the first and second displays 461 and 462, with the second image in a lower part of the first display 461 and the fourth image in a lower part of the second display 462 on a screen divided at the ratio corresponding to the pressure of the first input 2601, that is, the fifth level and the pressure of the second input 2602, that is, the fourth level.

As described above, the electronic device 101 according to various embodiments of the present disclosure may display a screen divided at a ratio corresponding to the pressure of a received input. The above description of screen division corresponding to the pressure of an input is exemplary and thus should not be construed as limiting the present disclosure. Therefore, it is to be understood that the electronic device 101 according to various embodiments of the present disclosure may display screens divided at various ratios corresponding to the pressures of inputs according to selection of a user or a designer.

As described above, the electronic device 101 according to various embodiments of the present disclosure may provide a hotkey for executing a specific function corresponding to the pressure of at least one input.

In addition, the electronic device 101 according to various embodiments of the present disclosure may recognize the pressure of an input to at least one display as a password pattern. For example, the electronic device 101 may recognize, as a password pattern, one or more of the pressure of at least one input to at least one display and the difference between the pressures of a plurality of inputs to the at least one display. Also, the electronic device 101 may recognize the pressures and positions of a plurality of inputs to at least one display as a password pattern.

The above operations will be described with reference to FIGS. 27, 28, and 29.

Figure 27:
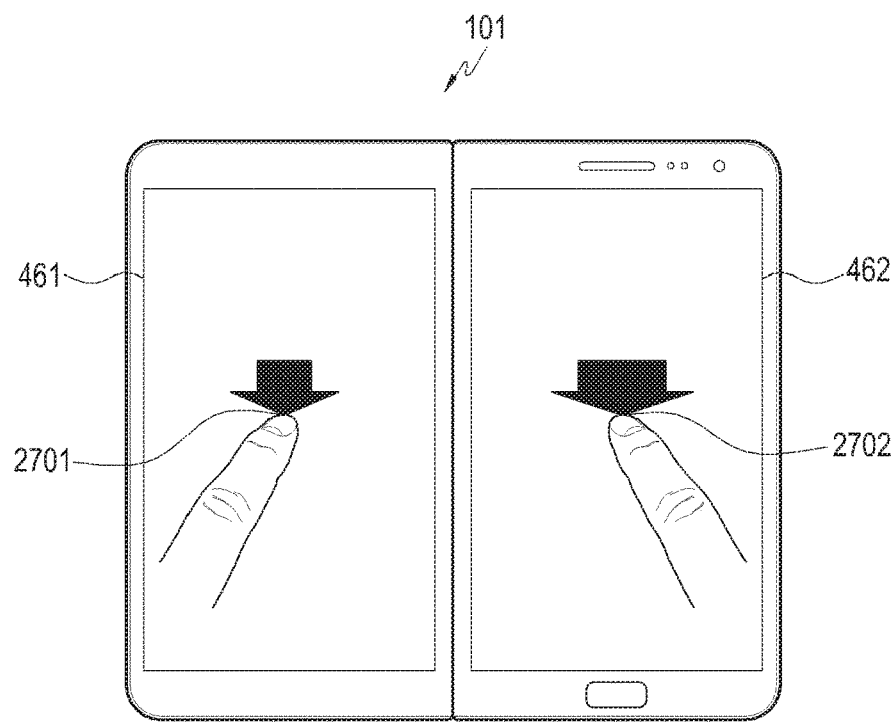
FIG. 27 is a view illustrating password input corresponding to the pressure of an input according to various embodiments of the present disclosure.

FIG. 27 is a view illustrating input of a password corresponding to the pressure of an input according to various embodiments of the present disclosure.

Referring to FIG. 27, the electronic device 101 may receive a first input 2701 being a touch on a partial area of the first display 461 and a second input 2702 being a touch on a partial area of the second display 462. The first and second displays 461 and 462 may be in the turn-on or turn-off state. If the first and second displays 461 and 462 are in the turn-on state, a lock screen or a password input screen may be displayed. The pressure of the first input 2701 may be the second level and the pressure of the second input 2702 may be the fourth level. The pressure of each of the first and second inputs 2701 and 2702 may be equal to or greater than, or equal to or less than the threshold. If the pressure of each of the first and second inputs 2701 and 2702 is equal to a predetermined pressure for a password, the electronic device 101 may determine that a required password has been received. In an embodiment, if the pressure of each of the first and second inputs 2701 and 2702 is equal to the predetermined pressure for the password, the electronic device 101 may release the displayed lock screen. In another embodiment, if the first and second displays 461 and 462 are in the turn-off state, and the pressure of each of the first and second inputs 2701 and 2702 is equal to the predetermined pressure for the password, the electronic device 101 may display a default screen on the first and second displays 461 and 462. The default screen may be a home screen.

Figure 28:
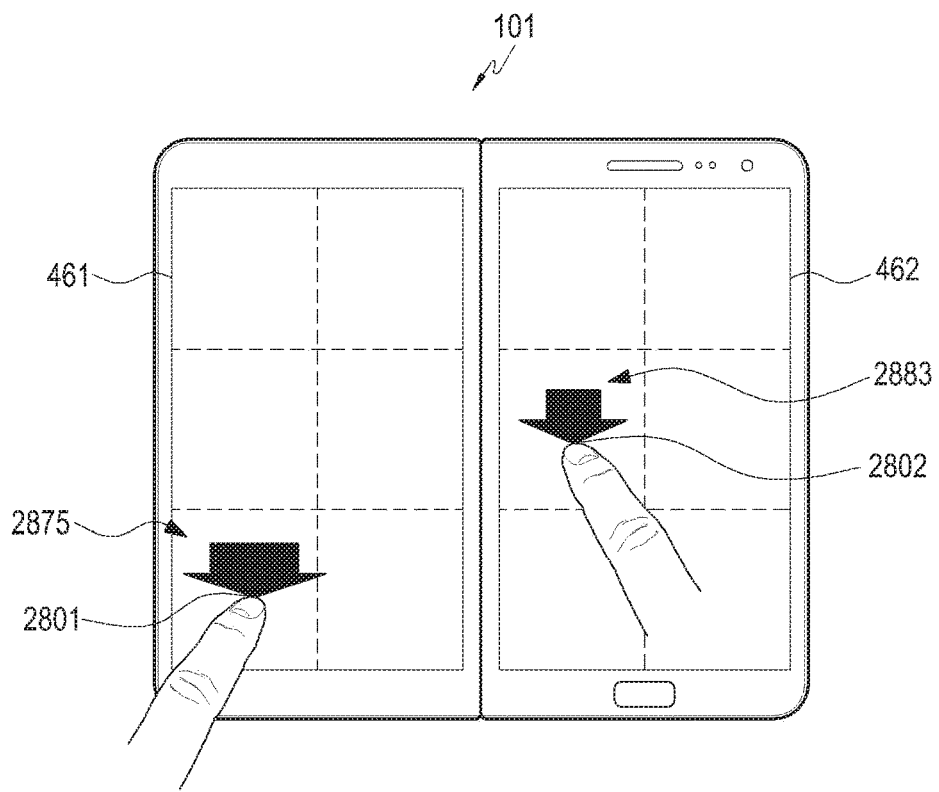
FIG. 28 is a view illustrating password input corresponding to the pressure of an input according to various embodiments of the present disclosure.

FIG. 28 is a view illustrating input of a password corresponding to the pressure of an input according to various embodiments of the present disclosure.

Referring to FIG. 28, each of the first and second displays 461 and 462 of the electronic device 101 may be divided into a plurality of areas. Lines that define the plurality of areas may or may not be drawn on each of the first and second displays 461 and 462. The electronic device 101 may receive an input to at least one of the plurality of divided areas in each of the first and second displays 461 and 462, and recognize the pressure of the input and the area corresponding to the input as a password pattern. The electronic device 101 may receive a first input 2801 being a touch on a fifth area 2875 among the plurality of areas of the first display 461, and a second input 2802 being a touch on a third area 2883 among the plurality of areas of the second display 462. The first and second displays 461 and 462 may be in the turn-on or turn-off state. If the first and second displays 461 and 462 are in the turn-on state, a lock screen or a password input screen may be displayed. The pressure of the first input 2801 may be the fourth level and the pressure of the second input 2802 may be the third level. The pressure of each of the first and second inputs 2801 and 2802 may be equal to or greater than, or equal to or less than the threshold. If the pressure and area of each of the first and second inputs 2801 and 2802 match a predetermined pressure and area for a password, the electronic device 101 may determine that a required password has been received. In an embodiment, if the pressure and area of each of the first and second inputs 2801 and 2802 match the predetermined pressure and area for the password, the electronic device 101 may release the displayed lock screen. In another embodiment, if the first and second displays 461 and 462 are in the turn-off state, and the pressure and area of each of the first and second inputs 2801 and 2802 match the predetermined pressure and area for the password, the electronic device 101 may display a default screen on the first and second displays 461 and 462. The default screen may be a home screen.

Figure 29:
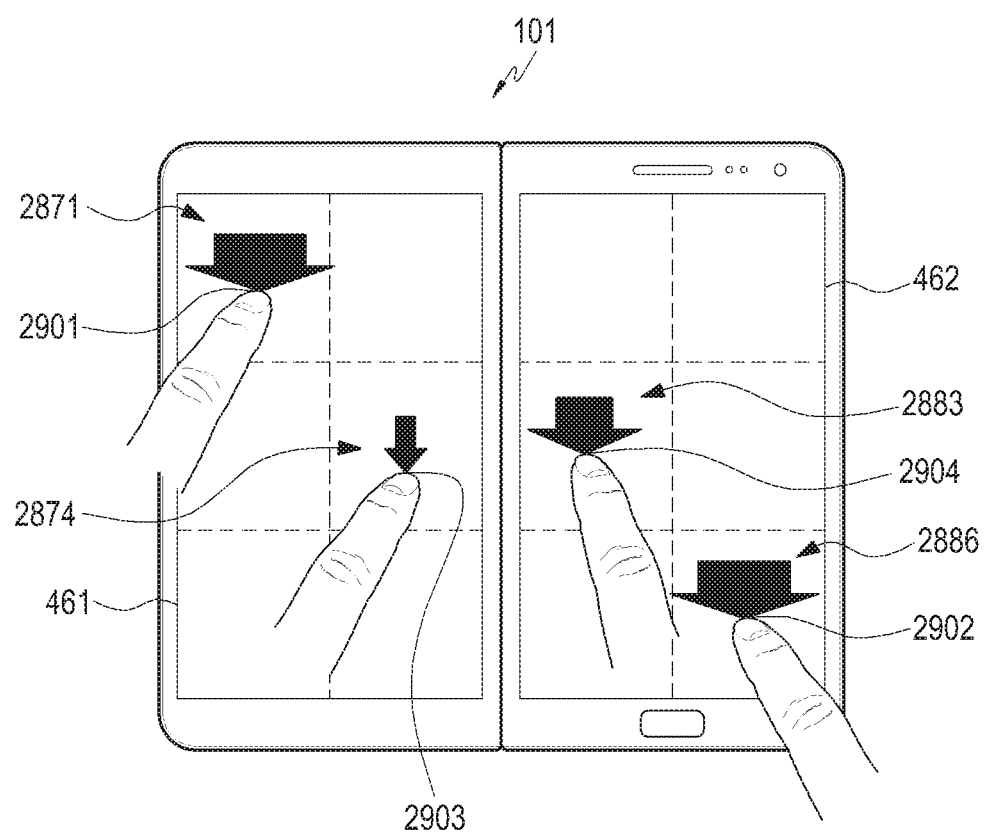
FIG. 29 is a view illustrating password input corresponding to the pressure of an input according to various embodiments of the present disclosure.

FIG. 29 is a view illustrating input of a password corresponding to the pressure of an input according to various embodiments of the present disclosure.

Referring to FIG. 29, each of the first and second displays 461 and 462 of the electronic device 101 may be divided into a plurality of areas. Lines that define the plurality of areas may or may not be drawn on each of the first and second displays 461 and 462. The electronic device 101 may receive a plurality of inputs to the plurality of divided areas in each of the first and second displays 461 and 462, and recognize the input order, pressures, and areas of the plurality of inputs as a password pattern. The electronic device 101 may receive a first input 2901 being a touch on a first area 2871 at the fourth pressure level among the plurality of areas of the first display 461, a second input 2902 being a touch on a sixth area 2886 at the fourth pressure level among the plurality of areas of the second display 462, a third input 2903 being a touch on a fourth area 2874 at the first pressure level among the plurality of areas of the first display 461, and a fourth input 2904 being a touch on a third area 2883 at the third pressure level among the plurality of areas of the second display 462. The first and second displays 461 and 462 may be in the turn-on or turn-off state. If the first and second displays 461 and 462 may be in the turn-on state, a lock screen or a password input screen may be displayed. The pressure of each of the first to fourth inputs 2901 to 2904 may be equal to or greater than, or equal to or less than the threshold. If the input order, pressures, and areas of the first to fourth inputs 2901 to 2904 match a predetermined input order, predetermined pressures, and predetermined areas for a password, the electronic device 101 may determine that a required password has been received. In an embodiment, if the input order, pressures, and areas of the first to fourth inputs 2901 to 2904 match the predetermined input order, predetermined pressures, and predetermined areas for the password, the electronic device 101 may release the displayed lock screen. In another embodiment, if the input order, pressures, and areas of the first to fourth inputs 2901 to 2904 match the predetermined input order, predetermined pressures, and predetermined areas for the password, the electronic device 101 may display a default screen on the first and second displays 461 and 462. The default screen may be a home screen.

In addition, the electronic device 101 according to various embodiments of the present disclosure may receive a plurality of inputs to at least one display, and recognize the difference between the pressures of the inputs as a password pattern. For example, the electronic device 101 may receive a first input applied to the first display 461 at the first pressure level, and a second input applied to the second display 462 at the third pressure level, and recognize the difference between the pressures of the first and second inputs as a password. Accordingly, if the difference between the pressures of the first and second inputs is equal to a predetermined pressure difference for a password, the electronic device 101 may determine that a required password has been received.

The above description of a password pattern based on the pressure of an input is exemplary and thus should not be construed as limiting the present disclosure. Therefore, it is to be understood that the electronic device 101 according to various embodiments of the present disclosure may use a password pattern based on the pressure of an input in various manners according to selection of a user or a designer.

In addition, the electronic device 101 according to various embodiments of the present disclosure may use one or more of the pressure of at least one input and the difference between the pressures of a plurality of inputs for a game application.

This operation will be described below with reference to FIG. 30.

Figure 30:
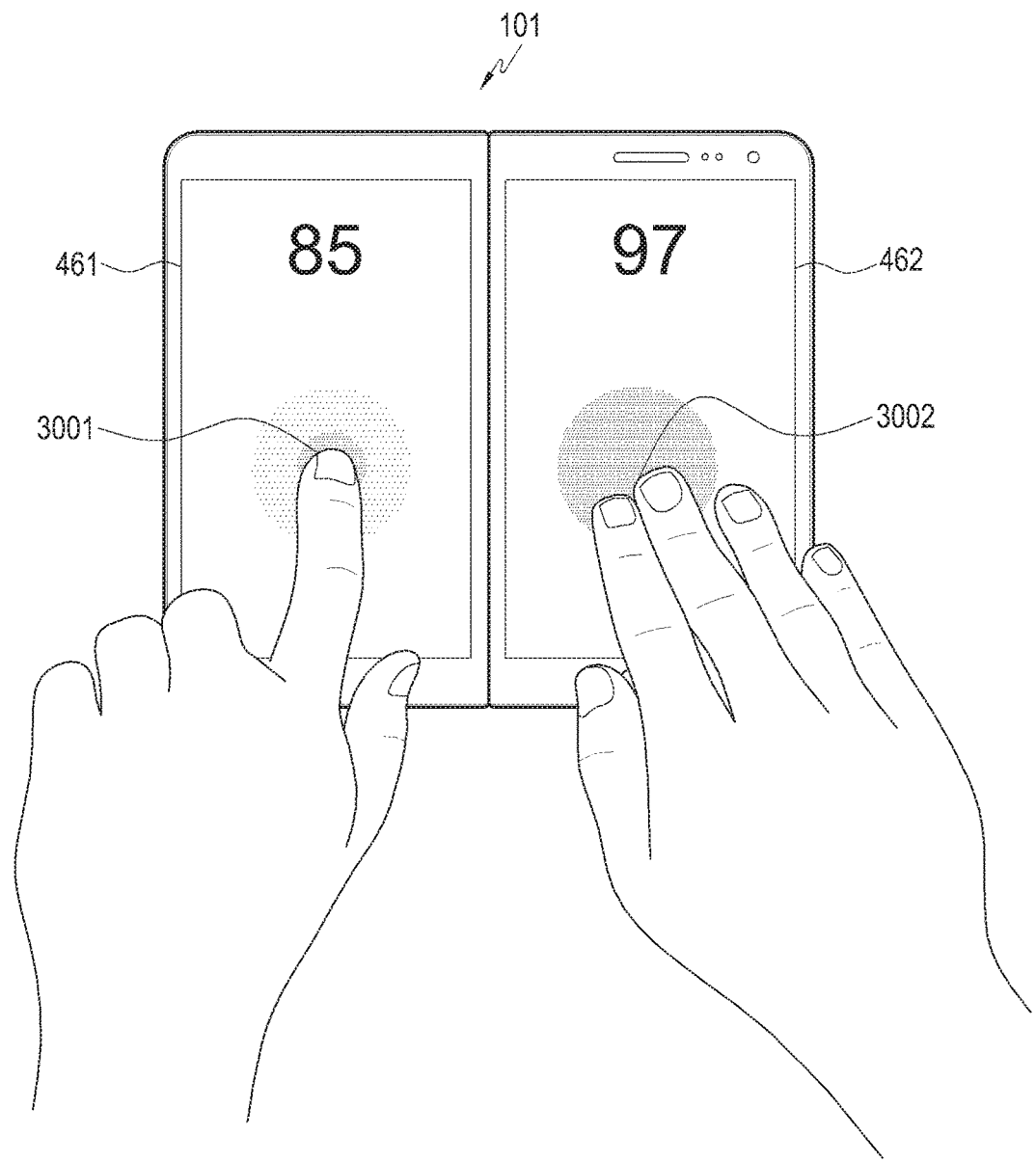
FIG. 30 is a view illustrating play of a game based on the pressure of an input according to various embodiments of the present disclosure.

FIG. 30 is a view illustrating a game using the pressure of an input according to various embodiments of the present disclosure.

Referring to FIG. 30, the electronic device 101 may receive a first input 3001 to the first display 461 and a second input 3002 to the second display 462. The first and second inputs 3001 and 3002 may be inputs from the same or different users. The electronic device 101 may display the level of the pressure of the first input 3001 on the first display 461 and the level of the pressure of the second input 3002 on the second display 462. Also, the electronic device 101 may use the pressure of each of the first and second inputs 3001 and 3002 as an input to the game application. Also, the electronic device 101 may use the difference between the pressures of the first and second inputs 3001 and 3002 as an input to the game application.

In addition, when displaying content occupying a plurality of pages on the display 160, the electronic device 101 according to various embodiments of the present disclosure may turn a page based on the pressure of an input to the displayed content.

This operation will be described below with reference to FIG. 31.

Figure 31:
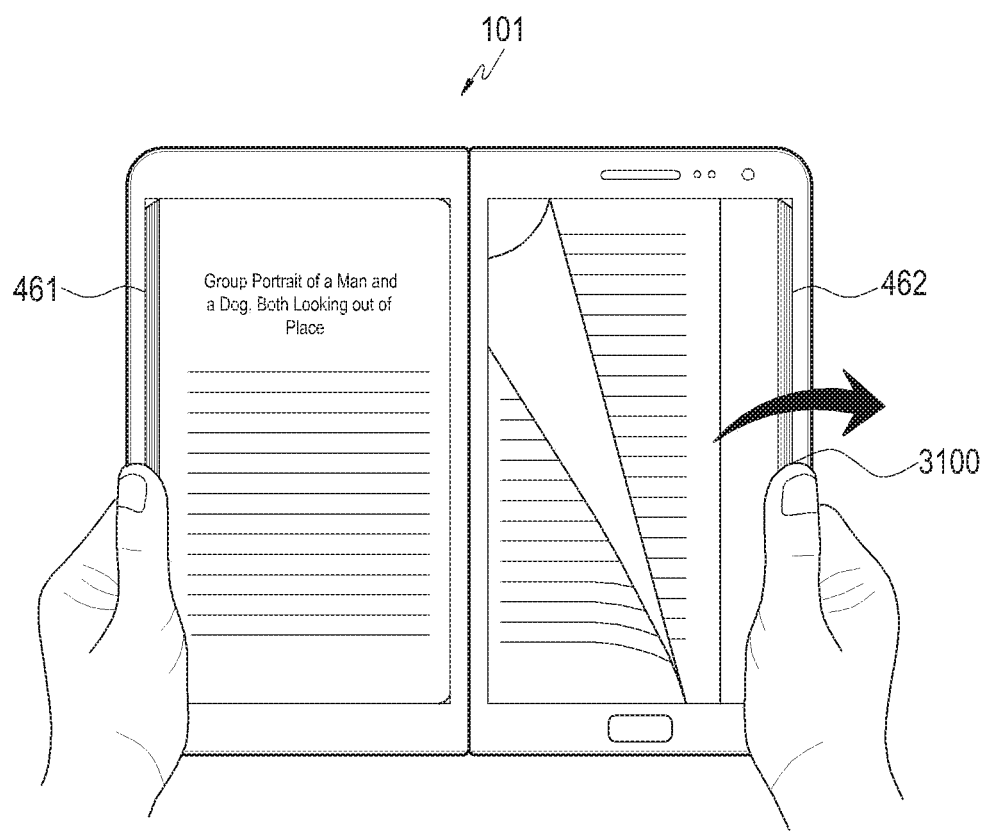
FIG. 31 is a view illustrating page turning according to various embodiments of the present disclosure.

FIG. 31 is a view illustrating page turning according to various embodiments of the present disclosure.

Referring to FIG. 31, the electronic device 101 may display e-book content on the first and second displays 461 and 462. The electronic device 101 may receive a right swipe 3100 on a partial right area of the second display 462. The pressure of the input 3100 may be a seventh level equal to or greater than the threshold. The electronic device 101 may turn the pages of the e-book content displayed on the first and second displays 461 and 462 in correspondence with the pressure of the input 3100. If the pressure of the input 3100 increases, the electronic device 101 may increase the number of pages turned during a predetermined time. If the pressure of the input 3100 decreases, the electronic device 101 may decrease the number of pages turned during a predetermined time. The above description of page turning is exemplary and should not be construed as limiting the present disclosure. Therefore, it is to be understood that the electronic device 101 according to various embodiments of the present disclosure may turn pages in correspondence with the pressure of an input in various manners according to selection of a user or a designer. For example, the electronic device 101 may jump from the pages of a plurality of images displayed on the display 160 to a page in correspondence with the pressure of an input.

The above description of an electronic device is also applicable to an electronic device equipped with a single display. Accordingly, the electronic device with a single display may sense the pressure of an input and execute a function in correspondence with the sensed pressure.

While the above description of an electronic device has been given in the context of a touch input, the same thing applies to an input applied with various tools, such as a pen input, as well as a touch input. For example, the electronic device according to various embodiments of the present disclosure may sense the pressure of a pen input to a display of the electronic device, and execute a function corresponding to the sensed pressure.

As is apparent from the foregoing description, according to various embodiments of the present disclosure, an electronic device for sensing the pressure of an input, and a method for operating the electronic device can be provided. The electronic device according to various embodiments of the present disclosure can sense the pressure of an input as well as the position and pattern of the input, and execute a function corresponding to the sensed pressure. Further, if the sensed pressure of the input is less than a threshold, the electronic device according to various embodiments of the present disclosure can execute a function corresponding to the input. On the other hand, if the sensed pressure of the input is equal to or greater than the threshold, the electronic device according to various embodiments of the present disclosure can execute a function corresponding to the pressure of the input. Therefore, a new input pattern can be added to existing input patterns allocated to inputs. Consequently, a user can apply various inputs in combination, for various functions of the electronic device.

Each of the components of the above-described electronic device may include one or more parts, and the name of each component may be changed according to the type of the electronic device. According to various embodiments of the present disclosure, the electronic device may be configured to include at least one of the afore-described components. A part of the components may be omitted or a new component may be added to the components. Also, a part of the components of the electronic device according to various embodiments of the present disclosure may be combined into a single entity which still executes the same functions as executed by the components prior to the combining.

The term 'module' as used herein may include its ordinary meaning including, for example, a unit of one, or a combination of two or more of hardware, software, and firmware. The term 'module' may be used interchangeably with terms such as, for example, unit, logic, logical block, component or circuit. A 'module' may be the smallest unit of an integrated part or a portion thereof. A 'module' may be the smallest unit for performing one or more functions, or a portion thereof. A 'module' may be implemented mechanically, or electronically. For example, a 'module' may include at least one of a known, or to-be-developed, application-specific integrated circuit (ASIC) chip, field-programmable gate array (FPGA) or programmable logic device that perform certain operations.

At least a part of apparatuses (for example, modules or their functions) or methods (for example, operations) according to various embodiments of the present disclosure may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

The computer-readable medium may include hard disk, floppy disk, magnetic media (for example, magnetic tape), optical media (for example, compact disc (CD)-ROM), DVD, magneto-optical media (for example, floptical disk), hardware devices (for example, ROM, RAM or flash memory), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments of the present disclosure.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device having a plurality of displays, the method comprising:
   sensing pressure of a first input to a first display among the plurality of displays;
   sensing pressure of a second input to a second display among the plurality of displays;
   in response to the sensed pressure of the first input to the first display being equal to or greater than a threshold, executing a first function; and
   in response to the sensed pressure of the second input to the second display being equal to or greater than the threshold, executing a second function which is different from the first function,
   wherein the executing of the first function is based on the pressure of the first input and the executing of the second function is based on the pressure of the second input.

2. The method of claim 1, wherein the executing of the first function comprises entering an image adjust mode to adjust a position or a size of at least one image displayed on the plurality of displays.

3. The method of claim 2, further comprising:
   receiving an adjustment input for adjusting the at least one of the position or the size of at least one image displayed on the plurality of displays in the image adjust mode; and
   displaying the at least one image having the at least one of the position or the size adjusted in correspondence with the adjustment input on at least one of the plurality of displays.

4. The method of claim 1, wherein the executing of the first function comprises displaying an image in a size corresponding to the sensed pressure of the first input on at least one of the plurality of displays.

5. The method of claim 4, wherein, in response to the sensed pressure being equal to or greater than a first threshold, the displaying of the image corresponding to the first input in the size corresponding to the sensed pressure of the first input comprises displaying the image corresponding to the first input across all of the plurality of displays.

6. The method of claim 4, wherein the displaying of the image in the size corresponding to the sensed pressure of the first input comprises displaying the image in the size corresponding to the sensed pressure and display the image in a position corresponding to a direction of the first input on at least one of the plurality of displays.

7. The method of claim 1,
   wherein the executing of the first function further comprises:
      if each of the first input and the second input is equal to or greater than a second threshold, displaying a first image displayed on the first display on the second display; and
      displaying a second image displayed on the second display on the first display.

8. The method of claim 1,
   wherein the executing of the first function further comprises:
      displaying a first image in a size corresponding to the pressure of the first input on the first display, and
      displaying a second image in a size corresponding to the pressure of the second input on the second display.

9. An electronic device comprising:
   a plurality of displays;
   a pressure sensor configured to sense pressure of a first input to a first display among the plurality of displays and of a second input to a second display among the plurality of displays;
   a memory; and
   a processor electrically connected to the memory,
   wherein the memory stores instructions configured to be executed by the processor,
   wherein the processor is configured to control for:
      sensing pressure of the first input to the first display among the plurality of displays,
      sensing pressure of the second input to the second display among the plurality of displays, in response to each of the sensed pressure of the first input to the first display being equal to or greater than a threshold, executing a first function, and in response to the sensed pressure of the second input to the second display being equal to or greater than the threshold, executing a second function which is different from the first function, wherein the processor executes the first function based on the pressure of the first input and executes the second function based on the pressure of the second input.

10. The electronic device of claim 9, wherein the processor is further configured to control for entering an image adjust mode to adjust at least one of a position or a size of at least one image displayed on the plurality of displays.

11. The electronic device of claim 10, wherein the processor is further configured to control for:

upon receipt of an adjustment input, adjusting at least one of the position or size of at least one image displayed on the plurality of displays in the image adjust mode, and displaying the image having the at least one of the position or the size adjusted in correspondence with the adjustment input on at least one of the plurality of displays.

12. The electronic device of claim 9, wherein the processor is further configured to control for displaying an image in a size corresponding to the sensed pressure of the first input on at least one of the plurality of displays, as the first function.

13. The electronic device of claim 12, wherein the processor is further configured to control for, if the sensed pressure is equal to or greater than a first threshold, displaying the image corresponding to the first input across all of the plurality of displays.

14. The electronic device of claim 12, wherein the processor is further configured to control for displaying the image in the size corresponding to the sensed pressure and display the image in a position corresponding to a direction of the first input on at least one of the plurality of displays.

15. The electronic device of claim 9, wherein the processor is further configured to control for:

if each of the first input and the second input is equal to or greater than a second threshold, displaying a first image displayed on the first display on the second display, and displaying a second image displayed on the second display on the first display.

16. The electronic device of claim 9, wherein the processor is further configured to control for:

displaying a first image in a size corresponding to the pressure of the first input on the first display, and displaying a second image in a size corresponding to the pressure of the second input on the second display.

17. The electronic device of claim 9, wherein the processor is further configured to control for executing an application corresponding to the pressure of the first input and the pressure of the second input.

18. The electronic device of claim 9, wherein the processor is further configured to control for displaying each of a plurality of images displayed on the plurality of displays at a screen ratio corresponding to the pressure of the first input and the pressure of the second input.

* * * * *